US008381230B2

(12) United States Patent
Dozsa et al.

(10) Patent No.: US 8,381,230 B2
(45) Date of Patent: Feb. 19, 2013

(54) MESSAGE PASSING WITH QUEUES AND CHANNELS

(75) Inventors: Gabor J. Dozsa, Ardsley, NY (US); Philip Heidelberger, Cortlandt Manor, NY (US); Sameer Kumar, White Plains, NY (US); Joseph D. Ratterman, Rochester, MN (US); Burkhard Steinmacher-Burow, Esslingen (DE)

(73) Assignee: International Business Machines Corporation

( * ) Notice: Subject to any disclaimer, the term of this patent is extended or adjusted under 35 U.S.C. 154(b) by 373 days.

(21) Appl. No.: 12/764,315

(22) Filed: Apr. 21, 2010

(65) Prior Publication Data

US 2011/0265098 A1   Oct. 27, 2011

(51) Int. Cl.
*G06F 3/00* (2006.01)

(52) U.S. Cl. ...................................................... 719/314

(58) Field of Classification Search .................. 719/313, 719/314

See application file for complete search history.

(56) References Cited

U.S. PATENT DOCUMENTS

| | | | |
|---|---|---|---|
| 6,996,559 B1 * | 2/2006 | Beshai | 1/1 |
| 7,372,864 B1 * | 5/2008 | Reast et al. | 370/428 |
| 2003/0182464 A1 * | 9/2003 | Hamilton et al. | 709/314 |
| 2006/0251091 A1 * | 11/2006 | Terauchi | 370/412 |

OTHER PUBLICATIONS

S. Chandrasekhar, Investigation of Crosstalk Performance of Eight-Channel p-i-n/HBT OEIC Photoreceiver Array Modules, 1996.*
Mao Jiayin et al., "Overlapping Communication and Computation in MPI by Multithreading," pp. 1-6.
Boris V. Protopopov et al., "A Multithreaded Message Passing Interface (MPI) Architecture: Performance and Program Issues," Journal of Parallel and Distributed Computing, Apr. 2001, pp. 1-3, vol. 61, Issue 4, Academic Press (Abstract).

* cited by examiner

*Primary Examiner* — Lechi Truong
(74) *Attorney, Agent, or Firm* — Owen J. Gamon

(57) ABSTRACT

In an embodiment, a reception thread receives a source node identifier, a type, and a data pointer from an application and, in response, creates a receive request. If the source node identifier specifies a source node, the reception thread adds the receive request to a fast-post queue. If a message received from a network does not match a receive request on a posted queue, a polling thread adds a receive request that represents the message to an unexpected queue. If the fast-post queue contains the receive request, the polling thread removes the receive request from the fast-post queue. If the receive request that was removed from the fast-post queue does not match the receive request on the unexpected queue, the polling thread adds the receive request that was removed from the fast-post queue to the posted queue. The reception thread and the polling thread execute asynchronously from each other.

24 Claims, 13 Drawing Sheets

MESSAGE PASSING WITH QUEUES AND CHANNELS

STATEMENT REGARDING FEDERALLY SPONSORED RESEARCH OR DEVELOPMENT

This invention was made with Government support under Contract No. B554331 awarded by the Department of Energy. The Government has certain rights in this invention.

FIELD

An embodiment of the invention generally relates to computer systems and more particularly relates to the passing of messages via queues, channels, and multiple threads of execution.

BACKGROUND

Computer systems typically comprise a combination of hardware, such as semiconductors, transistors, chips, and circuit boards, and computer programs. As increasing numbers of smaller and faster transistors can be integrated on a single chip, new processors are designed to use these transistors effectively to increase performance. Currently, many computer designers opt to use the increasing transistor budget to build ever bigger and more complex uni-processors. Alternatively, multiple smaller processor cores can be placed on a single chip, which is beneficial because a single, simple processor core is less complex to design and verify. This results in a less costly and complex verification process, as a once verified module, the processor, is repeated multiple times on a chip.

A technique known as parallel computing takes advantage of multi-processors. Parallel computing is the partitioning or dividing of an algorithm into units, often called threads, which are simultaneously or concurrently executed on multiple processors. The intermediate results of these multiple threads are then combined into a final result. Thus, parallel computing is based on the idea that the process of solving a problem usually can be divided into smaller tasks, which may be carried out simultaneously with some coordination. Parallel computing is valuable because performing a large task by the parallel execution of smaller tasks can be faster than performing the large task via one serial (non-parallel) algorithm.

The parallel threads are often implemented on computer systems that include multiple processors and/or on multiple computer systems (often called compute nodes or simply nodes) that comprise processors, which run the parallel threads or local instances of global applications to accomplish tasks. The parallel thread or threads local to a particular node need a way to communicate with other parallel threads, which is often accomplished via a technique known as message passing. To ensure proper communication between various nodes, a standard known as the Message Passing Interface (MPI) has been developed.

Under the MPI standard, an MPI program consists of autonomous processes, executing their own code, which need not be identical. Typically, each process or application communicates via calls to MPI communication primitives, where each process executes in its own and shared memory. Such message passing allows the local processors comprising the node and applications running thereon (a thread or instance of the global application or process) to cooperate with each other. MPI is available on a wide variety of platforms, ranging from networks of workstations to massively parallel systems.

Massively parallel systems often use Direct Memory Address (DMA) technology, which reduces processor workload in the management of memory operations required for messaging. DMA engines, also known as message units, work in conjunction with a local thread to implement the MPI application. Workload that would normally need to be processed by a processor at a node is instead handled by the DMA engine.

SUMMARY

A method, computer-readable storage medium, and computer system are provided. In an embodiment, a reception thread receives a source node identifier, a type, and a data pointer from an application and, in response, creates a receive request. If the source node identifier specifies a source node, the reception thread selects a channel and adds the receive request to a fast-post queue in the channel. If the source node identifier does not specify a source node, the reception thread adds the receive request to an any-source queue. If a message received from a network does not match a receive request on a posted queue, a polling thread adds a receive request that represents the message to an unexpected queue. If the fast-post queue contains the receive request, the polling thread removes the receive request from the fast-post queue. If the receive request that was removed from the fast-post queue matches a receive request on the unexpected queue, the polling thread removes the receive request from the unexpected queue and copies message data from a message unit to a memory location identified by the receive request that was removed from the fast-post queue. If the receive request that was removed from the fast-post queue does not match the receive request on the unexpected queue, the polling thread adds the receive request that was removed from the fast-post queue to the posted queue. In various embodiments, adding the receive request to the fast-post queue executes faster than adding the receive request to the posted queue, the application executes synchronously within the reception thread, and the reception thread and the polling thread execute asynchronously from each other.

DETAILED DESCRIPTION

Figure 1:
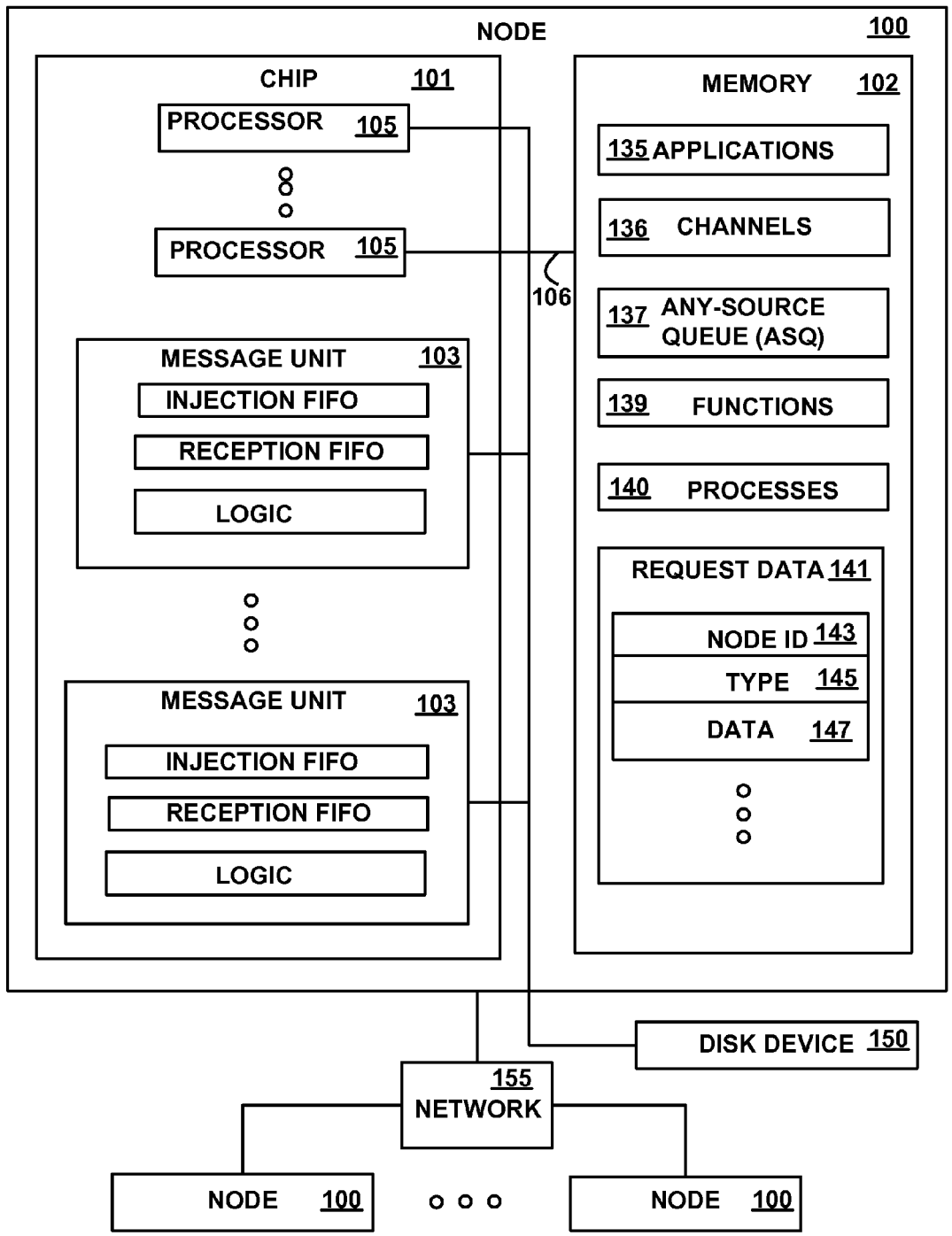
FIG. 1 depicts a high-level block diagram of an example system for implementing an embodiment of the invention.

Referring to the Drawings, wherein like numbers denote like parts throughout the several views, FIG. 1 depicts a high-level block diagram representation of node computer systems 100 connected via a network 155. The node computer systems 100 send and receive messages to each other via the network 155, with one node acting as a source node that sends a message, and another node acting a destination node that receives the message from the source node. In an embodiment, a node computer system that acts as the source node with respect to one message may act as the destination node with respect to another message, and vice versa.

The major components of the nodes 100 comprise one or chips 101 comprising one or more processors 105 and message units 103 and a main memory 102, which are communicatively coupled, directly or indirectly, for inter-component communication via a bus 106. In an embodiment, one or more of the node computer systems 100 are also connected to disk devices 150 or other secondary storage. In an embodiment, the chip 101 is an Application Specific Integrated Circuit (ASIC), but in other embodiments any appropriate chip may be used. Although the memory 102 is illustrated as being separate from the chip 101, in another embodiment the memory 102 is embodied on the chip 101.

The processors 105 are general-purpose programmable central processing units (CPUs) and may include any number of levels of cache and cache controllers. Each processor 105 executes instructions stored in the main memory 102. The processors 105 are also know as cores or processor cores.

The main memory 102 is a random-access semiconductor memory, storage device, or storage medium for storing or encoding data and programs. The main memory 102 is conceptually a single monolithic entity, but in other embodiments the main memory 102 is a more complex arrangement, such as a hierarchy of caches memory devices. For example, the memory 102 may exist in multiple levels of memory devices of varying sizes and speeds. The memory 102 is shared by the processors 105.

The main memory 102 stores or encodes applications 135, channels 136, an any-source queue (ASQ) 137, functions 139, processes 140, and request data 141. Although the applications 135, the channels 136, the any-source queue 137, the functions 139, the processes 140, and the request data 141 are illustrated as being contained within the memory 102 in the node computer system 100, in other embodiments some or all of them may be on different computer system nodes and may be accessed remotely, e.g., via the network 155. The computer system node 100 may use virtual addressing mechanisms that allow the programs of the computer system 100 to behave as if they only have access to a large, single storage entity instead of access to multiple, smaller storage entities. Thus, while the applications 135, the channels 136, the any-source queue 137, the functions 139, the processes 140, and the request data 141 are illustrated as being contained within the main memory 102, these elements are not necessarily all completely contained in the same storage device at the same time. Further, although the applications 135, the channels 136, the any-source queue 137, the functions 139, the processes 140, and the request data 141 are illustrated as being separate entities, in other embodiments some of them, portions of some of them, or all of them may be packaged together.

In various embodiments, the applications 135 are user applications, third-party applications, operating systems, or any portion, multiple, or combination thereof. The applications 135 send and/or receive the request data 141 by sending/receive messages to and/or from the nodes 100 via the processes 140 and the network 155. The functions 139 are functions, methods, programs, or units of code, instructions, or statements. The functions 139 are specific to each of the applications 135 and communicate to the message units 103, as further described below with reference to FIG. 9.

In an embodiment, the applications 135, the functions 139, and/or the processes 140 comprise instructions or statements that execute on the processors 105 or instructions or statements that are interpreted by instructions or statements that execute on the processors 105, to carry out the functions as further described below with reference to FIGS. 7, 8, 9, 10, 11, 12, and 13. In another embodiment, the applications 135, the functions 139, and/or the processes 140 are implemented in hardware via semiconductor devices, chips, logical gates, circuits, circuit cards, and/or other physical hardware devices.

Each of the channels 136 is associated with a different message unit 103 and stores requests for data to be sent to or received from other nodes. The channels are further described below with reference to FIG. 3.

The any-source queue 137 stores receive requests for data to be received from any source node, without specifying the source node. The any-source queue 137 is used for all message units 103 is not associated with or exclusive to any particular message unit. The any-source queue 137 is further described below with reference to FIG. 6.

In various embodiments, the request data 141 comprise data for send requests and/or receive requests. Each of the request data 141 comprises a node identifier field 143, a type field 145, and a data field 147. In various embodiments, the node identifier 143 identifies the source node that sends the request, the destination node that receives the request, or both, and may include wild card characters that allow the specification of multiple nodes or any node. In other embodiments, the node identifier 143 may also specify a group or category of nodes to which the source and/or destination nodes belong.

In various embodiments, the type identifier 145 identifies a type, category, context, tag, rank, priority, or group to which the request, the node, or the data 147 belongs. The type identifier 145 describes or categorizes the data or node.

In various embodiments, the data field 147 comprises the data or the address of the data is to be sent to the destination node, comprises the data field or address of the data field where the request 141 desires data to be received from the source node, or comprises an address of a location within the reception FIFO buffer of one of the message units 103 that contains the data, depending on the request. In various embodiments, the data in or pointed to by the data field 147 is implemented as a file, an object, a database, a data structure, an array, a document, a folder, a library, a directory, a subdirectory, or any combination, multiple, or hierarchy thereof. In various embodiments, some or all of the applications 135 have exclusive access to portions of the data 147 or share access to portions of the data 147 with other applications.

The message units 103 comprise an injection FIFO (First In First Out) buffer, a reception FIFO buffer, and logic. The injection FIFO buffer and the reception FIFO buffer are implemented via random access semiconductor memory or via any other appropriate storage device. In an embodiment, the logic comprises instructions or statements stored in memory that execute on a processor of the message unit 103. In another embodiment, the logic is implemented in hardware via semiconductor devices, chips, logical gates, circuits, circuit cards, and/or other physical hardware devices. The message units 103 receive portions of the data 147 from the memory 102 and send those portions to other of the nodes 100 as messages via their respective injection FIFO buffer and the network 155. The message units 103 receive messages into their respective reception FIFO buffer from other of the nodes via the network 155 and send those messages to the data 147 in the memory 102. The processing performed by the logic is further described below with reference to FIG. 10.

In various embodiments, the disk devices 150 are implemented as disk drives, direct access storage devices, rotating magnetic disk drive storage devices, arrays of disk drives configured to appear as a single large storage device to a host computer, or any type of secondary storage device. The contents of the main memory 102, or any portion thereof, may be stored to and retrieved from the disk devices 150, as needed.

Although the bus 106 is shown in FIG. 1 as a relatively simple, single bus structure providing a direct communication path among the processors 105, the main memory 102, and the disk device 150, in fact the bus 106 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, bus 106 may comprise a memory bus, an I/O bus, I/O bus interface units, I/O processors, or any multiple and/or combination thereof.

In various embodiments, the node computer systems 100 are multi-user mainframe computer systems, single-user systems, or server computers or similar devices that have little or no direct user interface, but receive requests from other computer systems (clients). In other embodiments, the node computer systems 100 are implemented as desktop computers, portable computers, laptop or notebook computers, tablet computers, pocket computers, telephones, smart phones, pagers, automobiles, teleconferencing systems, appliances, or any other appropriate type of electronic devices.

In an embodiment, the nodes 100 are logically arranged in a three-dimensional lattice, each node having a respective x, y and z coordinate. Each node 100 in the lattice contains a set of node-to-node communication links for communicating data with its immediate neighbors in the x, y and z coordinate dimensions. As used herein, the term "lattice" includes any regular pattern of nodes 100 and inter-nodal data communications paths in more than one dimension, such that each node 100 has a respective defined set of neighbors, and such that, for any given node, it is possible to algorithmically determine the set of neighbors of the given node from the known lattice structure and the location of the given node in the lattice. A "neighbor" of a given node 100 is any node 100 which is linked to the given node 100 by a direct inter-nodal data communications path, i.e. a path which does not have to traverse another node. The lattice structure is a logical one, based on inter-nodal communications paths. It is not necessarily true that a given node's neighbors are physically the closest nodes 100 to the given node 100, although it is generally desirable to arrange the nodes 100 in such a manner, insofar as possible, so as to provide physical proximity of neighbors.

In one embodiment, the node lattice logically wraps to form a 3D (three dimensional) torus in all three coordinate directions, and thus has no boundary nodes. For example, if the node lattice contains $dim_x$ nodes in the x-coordinate dimension ranging from 0 to $(dim_x-1)$, then the neighbors of Node$((dim_x-1), y0, z0)$ include Node$((dim_x-2), y0, z0)$ and Node $(0, y0, z0)$, and similarly for the y-coordinate and z-coordinate dimensions. In other embodiments, a logical torus without boundary nodes is not necessarily a requirement of a lattice structure.

This aggregation of node-to-node communication links is referred to herein as the torus network. The torus network permits each node 100 to communicate results of data processing tasks to neighboring nodes for further processing in certain applications which successively process data in different nodes 100. But, the torus network contains only a limited number of links, and data flow is optimally supported when running generally parallel to the x, y, or z coordinate dimensions, and when running to successive neighboring nodes. For this reason, applications requiring the use of a large number of nodes may subdivide computation tasks into blocks of logically adjacent nodes (communicator sets) in a manner to support a logical data flow, where the nodes 100 within any block may execute a common application code function or sequence.

The network 155 may be any suitable network or combination of networks and may support any appropriate protocol suitable for communication of data and/or code to/from the nodes 100. In an embodiment, the network 155 may be implemented via an Ethernet network, but in other embodiments any appropriate network or combination of networks implementing any appropriate protocol may be used. In another embodiment, the network 155 may represent a storage device or a combination of storage devices, either connected directly or indirectly to the nodes 100.

Although only the network 155 is illustrated, in other embodiments additional networks may be present, such as the 3D torus network described above for point-to-point communication between the nodes 100 and a global barrier and interrupt network. Further the nodes 100 may be of any appropriate type and a variety of types, such as a compute node, a service node, an I/O (Input/Output) node, and some of the nodes may be connected via different networks.

It should be understood that FIG. 1 is intended to depict the representative major components of the nodes 100, the network 155, and the disk device 150 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs." The computer programs comprise one or more instructions or statements that are resident at various times in various memory and storage devices in the computer system 100, and that, when read and executed by one or more processors 105 in the computer system 100 or when interpreted by instructions that are executed by one or more processors, cause the computer system 100 to perform the actions necessary to execute steps or elements comprising the various aspects of embodiments of the invention.

As will be appreciated by one skilled in the art, aspects of embodiments of the present invention may be embodied as a system, method, or computer program product. Accordingly, aspects of embodiments of the present invention may take the form of an entirely hardware embodiment, an entirely program embodiment (including firmware, resident programs, micro-code, etc that are stored in a storage device) or an embodiment combining program and hardware aspects that may all generally be referred to herein as a "circuit," "module," or "system." Furthermore, embodiments of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the disk device 150), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device.

Program code embodied on a computer-readable medium may be transmitted using any appropriate medium, including but not limited to, wireless, wire line, optical fiber cable, Radio Frequency (RF), or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the present invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks. The computer programs defining the functions of various embodiments of the invention may be delivered to a computer system via a variety of tangible computer-readable storage media that may be operatively or communicatively connected (directly or indirectly) to the processor or processors.

The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one ore more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It should also be noted that each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the present invention may also be delivered as part of a service engagement with a client corporation, nonprofit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or program environments may be used without departing from the scope of embodiments the invention.

Figure 2:
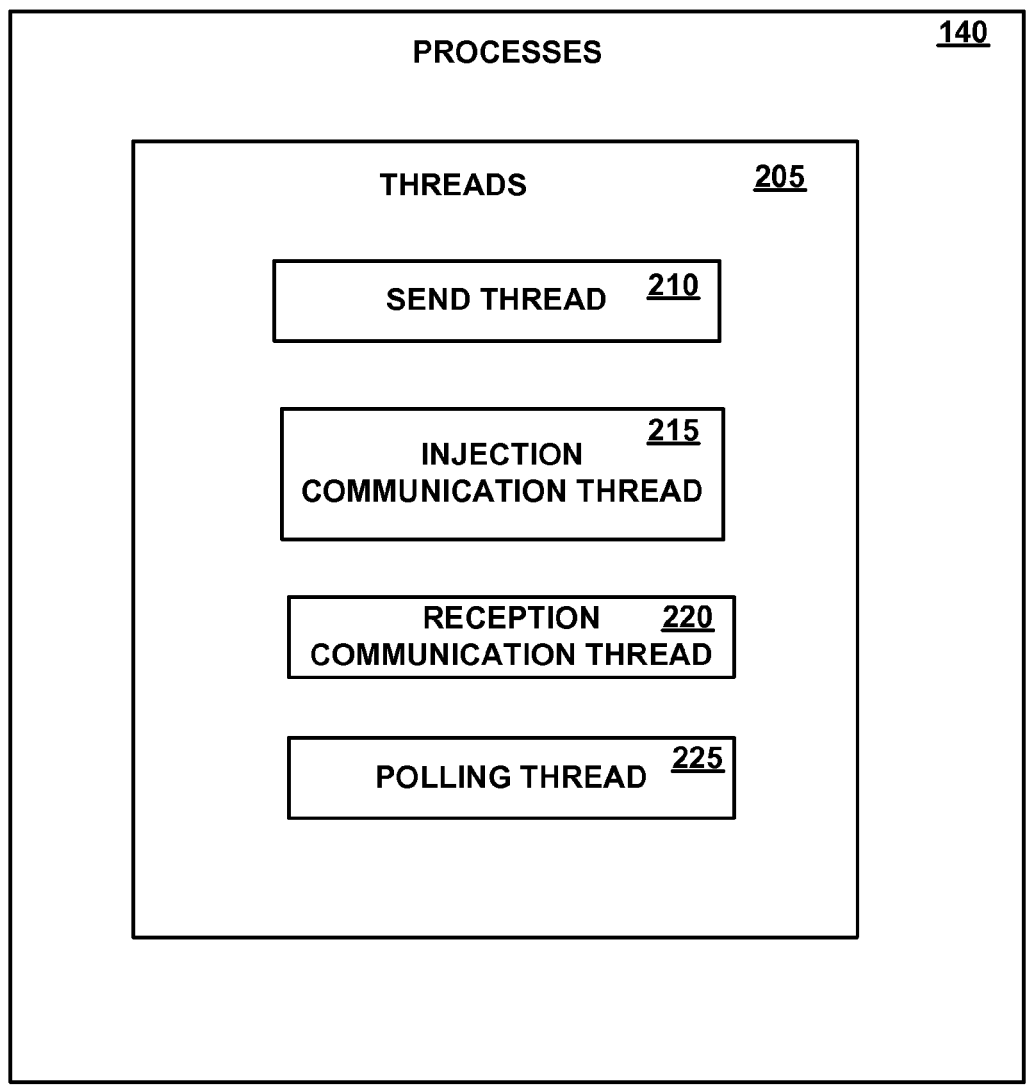
FIG. 2 depicts a block diagram illustrating processes and threads, according to an embodiment of the invention.

FIG. 2 depicts a block diagram illustrating the processes 140, according to an embodiment of the invention. The processes 140 comprise threads 205, which comprise a send thread 210, an injection communication thread 215, a reception communication thread 220, and a polling thread 225. In an embodiment, the threads 205 comprise instructions or statements that execute on the processors 105 or instructions or statements that are interpreted by instructions or statements that execute on the processors 105, to carry out the functions as further described below with reference to FIGS. 7, 8, 9, 10, 11, 12, and 13.

In an embodiment, the threads 205 execute concurrently, each on a different processor 105. In another embodiment, some or all of the threads 205 execute concurrently on the same processor, via a technique known as time-division multiplexing or multi-tasking, wherein the processor performs a context switch between different threads frequently enough, so that another process perceives the threads as running at the same time. In a context switch, the processor saves the state of a currently executing first thread and retrieves the state of a second thread, so that the second thread can be executed. When the processor starts executing the first thread later, its saved state is restored. The state of a thread includes such data as the values in the processor registers used by the thread and the program counter or instruction pointer, which indicates the next instruction to be executed within the thread.

The multiple currently executing threads 205 that exist within the same process 140 share resources such as memory; thus, the threads 205 may read from and write to the same data in the memory 102. Different processes do not share these same resources.

The send thread 210 coordinates the sending of the data 147 (whose ultimate destination is another of the nodes) from the applications 135 to the channels 136. The processing of the send thread 210 is further described below with reference to FIGS. 7 and 8.

The injection communication thread 215 coordinates the sending of the data 147 (whose ultimate destination is another of the nodes) from the channels 136 to the message unit 103. The processing of the injection communication thread 215 is further described below with reference to FIG. 9.

The reception communication thread 220 adds receive requests in response to invocations from the applications 135 (local applications on the same node as the reception communication thread 220) to the channels 136. The receive requests are commands that request that data be received from source nodes. The processing of the reception communication thread 220 is further described below with reference to FIG. 11.

The polling thread 225 coordinates the receiving of data from the reception FIFO buffer of the message unit 103 (the data was received from another of the nodes) and the sending of the data to the memory 102 via the channels 136. The processing of the polling thread 225 is further described below with reference to FIGS. 12 and 13.

In an embodiment, all of the threads 205 include identical code, but the execution control flow through the code varies depending on the functions that the particular thread performs. Thus, the terms "send thread," "injection communication thread," "reception communication thread," and "polling thread" are descriptive names that are used for convenience only and describe the functions that a thread performs at a particular time. But, at another time, that same thread can perform different functions. Thus, at different times, the same thread can perform some or all of the send thread functions, the injection communication thread functions, the reception communication thread functions, and the polling thread functions, so the descriptive name that is given to a thread can change over time. In another embodiment, some or all of the send thread, the injection communication thread, the reception communication thread, and the polling thread functions are performed by different threads. In an embodiment, the send thread 210, the injection communication thread 215, the reception communication thread 220, and the polling thread 225 execute asynchronously from each other, meaning they each perform their logic without waiting for another thread to perform its logic or reach a certain execution point.

In an embodiment, the applications 135 (FIG. 1) execute within one, some, or all of the threads 205 or execute within the same process 140 as some or all of the threads 205 and thus share the same resources and memory as some or all of the threads 205. In another embodiment, the applications 135 do not execute within any of the threads 205, or the applications 135 execute in a different process from the threads 205, so the applications 135 do not share the same resources and memory as the threads 205.

Figure 3:
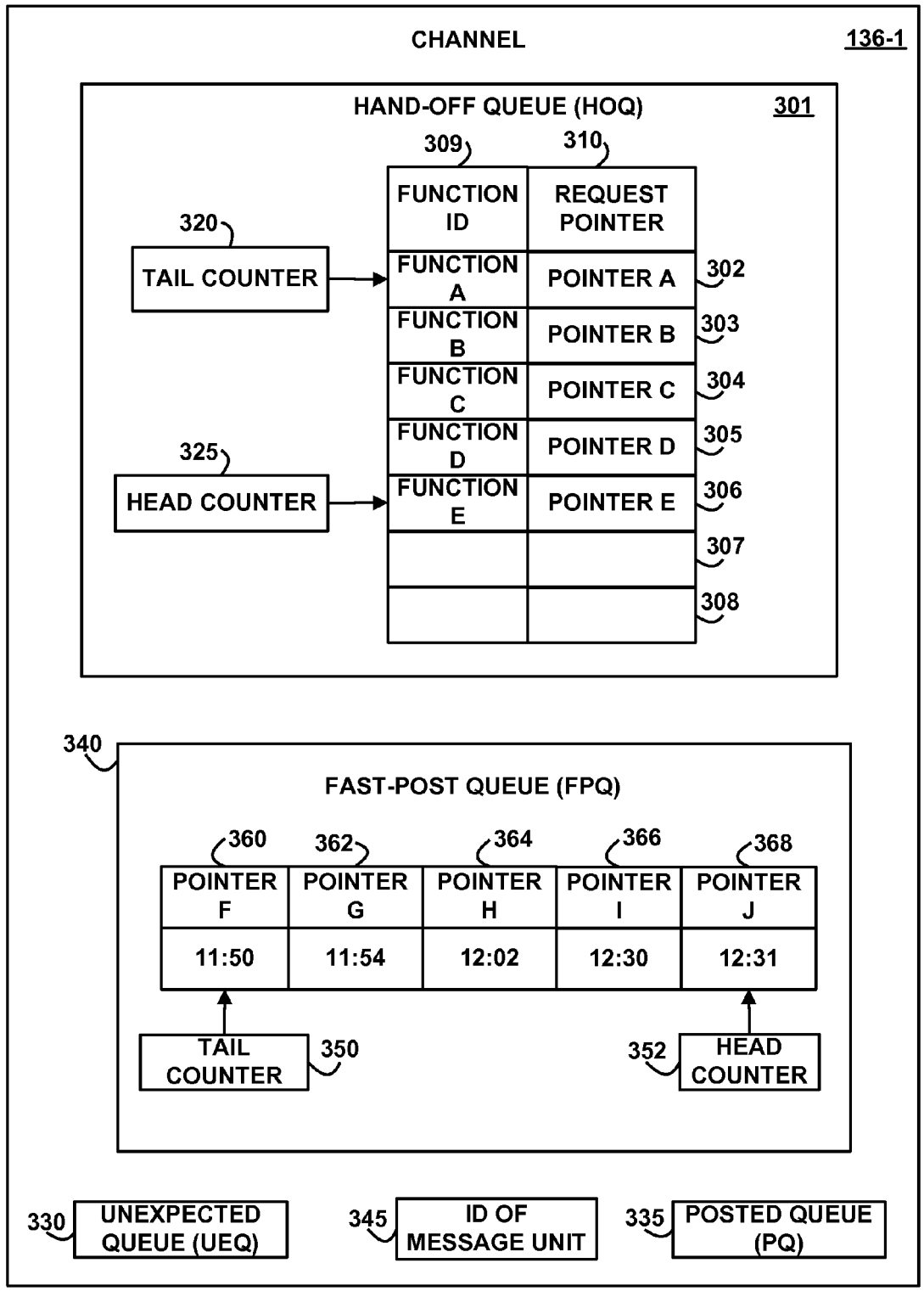
FIG. 3 depicts a block diagram of an example data structure for a channel, according to an embodiment of the invention.

FIG. 3 depicts a block diagram of an example data structure for a channel 136-1, according to an embodiment of the invention. The channel 136-1 is an example of one of the channels 136 (FIG. 1). Referring again to FIG. 3, the channel 136-1 comprises a hand-off queue 301, an unexpected queue 330, a posted queue 335, a fast-post queue 340, and an identifier of a message unit 345.

The hand-off queue 301 is a fixed length, randomly addressable queue comprising any fixed number of pre-allocated entries, such as the example entries 302, 303, 304, 305, 306, 307, and 308, a tail counter 320 and a head counter 325. The tail counter 320 points at or indicates the tail entry (illustrated as the entry 302) of the hand-off queue 301 and identifies the next entry to be removed from the hand-off queue 301. The head counter 325 points at the head entry (illustrated as the entry 306) of the hand-off queue 301 and identifies the most recent entry that was added to the hand-off queue 301. The entries 302, 303, 304, 305, and 306 are valid entries, meaning that they comprise send requests. The entries 307 and 308 are invalid or empty entries, meaning that they do not comprise requests that are eligible to be removed from the hand-off queue and sent to destination nodes.

In an embodiment, the hand-off queue 301 is an array, and the tail counter 320 and the head counter 325 are relative addresses or indexes from the start (top as illustrated in the example of FIG. 3) of the hand-off queue 301. When the hand-off queue 301 is empty and contains no send requests, the head counter 325 and the tail counter 320 both point to the same entry in the hand-off queue 301. When the hand-off queue 301 is full, the tail counter 320 equals the size of the hand-off queue minus the head counter 325.

Incrementing the head counter 325 and the tail counter 320 moves them down toward the end of the hand-off queue 301. Thus, the entries are located in contiguous memory locations in the same order as the order that the entries were added to the queue, with the tail entry being added first and the head entry being added last. The head counter 325 and the tail counter 320 are incremented mod the size of the hand-off queue 301, so when the head counter 325 or the tail counter 320 reach the end (the bottom or the entry 308, as illustrated in the example of FIG. 3) of the hand-off queue 301, they wrap back to the beginning or the first entry 302. The size or length of each queue entry is the amount that the header counter 325 and the tail counter 320 are incremented during queue operations, in order to add/remove entries to/from the hand-off queue 301.

The entries 302, 303, 304, 305, and 306 in the hand-off queue 301 comprise send requests, which were created in response to commands received from or functions called by the applications 135. The send requests are commands or requests to send data from an application at a source node to other destination nodes via the network 155, and the data has not yet been sent to the message unit 103. Each of the send requests in the hand-off queue 301 comprises a function identifier 309 and a pointer 310. The function identifier 309 identifies or names one of the functions 139. The request pointer 310 comprises an address that points at or identifies a portion of the request data 141 in the main memory 102. In response to being invoked, the function identified by the function identifier executes on the processor and sends the request pointer 310 (from the same send request as the function identifier) to the message unit 103 that is identified by the message unit identifier 345 in the same channel as the hand-off queue 301.

The entries 307 and 308 in the hand-off queue 301 do not identify send requests and are available to accept additional send requests. The entries 307 and 308 are illustrated as empty in FIG. 3, but they may contain random data or previous send requests that have already been removed from the hand-off queue 301, so the entries 307 and 308 are no longer valid, as they are beyond the send request 306, pointed to by the head counter 325 and before the tail entry (mod the size of the queue), pointed to by the tail counter 320.

The unexpected queue 330 stores receive requests that identify data received from source nodes via the message unit 103 and the network 155. The data identified by the requests in the unexpected queue 330 is located in the reception FIFO of the message unit 103 and has not yet been sent to the main memory 102. The unexpected queue 330 is further described below with reference to FIG. 4.

The posted queue 335 comprises entries that identify receive requests that were generated in response to function calls made by applications, added to the fast-post queue 340, and then later moved to the posted queue 335. These receive requests are commands or requests to receive data from other source nodes via the network 155. The posted queue 335 is further described below with reference to FIG. 5.

The fast-post queue 340 is a fixed length, randomly addressable queue comprising any fixed number of pre-allocated entries, such as the example entries 360, 362, 364, 366, and 368, a tail counter 350 and a head counter 352. The tail counter 360 points at the tail (illustrated as the entry 360) of the fast-post queue 340 and identifies the next entry to be removed from the fast-post queue 340. The head counter 352 points at the head (illustrated as the entry 368) of the fast-post queue 340 and identifies the most recent entry that was added to the fast-post queue 340. Since entries are only inserted/removed at the head/tail and the insertion or removal of entries at random or arbitrary locations within the fast-post queue 340 is not required, in an embodiment, the fast-post queue 340 is implemented as an array, in order to facilitate fast insertion and removal. But, in other embodiments, any appropriate data structure may be used to implemented the fast-post queue 340.

In the embodiment where the fast-post queue 340 is an array, the tail counter 350 and the head counter 352 are relative addresses from the start (left, in the example of FIG. 3) of the fast-post queue 340. When the fast-post queue 340 is empty and contains no valid requests, the head counter 352 and the tail counter 350 both point to the same entry in the fast-post queue 340. Incrementing the head counter 352 and the tail counter 350 moves them toward the end (the right, in the example of FIG. 3) of the fast-post queue 340. Thus, the entries are located in contiguous memory locations in the same order as the order that the entries were added to the queue, with the tail entry being added first and the head entry being added last. The head counter 352 and the tail counter 350 are incremented mod the size of the fast-post queue 340, so that when the head counter 352 or the tail counter 350 reach the end (right) of the queue, they wrap back to the beginning. The size or length of each query entry is the amount that the header counter 352 and the tail counter 350 are incremented during queue operations, in order to add/remove entries to/from the fast-post queue 340.

The entries 360, 362, 364, 366, and 368 in the fast-post queue 340 comprise receive requests, which created in response to invocations from the applications 135. The receive requests are commands or requests to receive data from other source nodes via the network 155.

The example fast-post queue 340 illustrated in FIG. 3 is full, meaning that all of the entries comprise receive requests and no entries are available. When the fast-post queue 340 is full, the tail counter 350 equals the size of the fast-post queue minus the head counter 352. Since the fast-post queue 340 is fixed length, its storage locations are preallocated, so another entry cannot be added to the example full fast-post queue 340 until an existing entry is removed. Each of the entries in the fast-post queue 340 comprises a request pointer and a time stamp. The time stamp indicates the time that the receive request was created. The pointers in the fast-post queue 340 identify the request data 141 in the main memory 102 that describes the data that the receive request desires to receive.

The message unit identifier 345 uniquely identifies one of the message units 103. Each of the message units 103 is identified by a different identifier 345 in a different channel. Thus, each of the message units 103 is associated with and transfers messages that are requested to be received by or sent by requests on a different hand-off queue 301, unexpected queue 330, posted queue 335, and fast-post queue 340.

Figure 4:
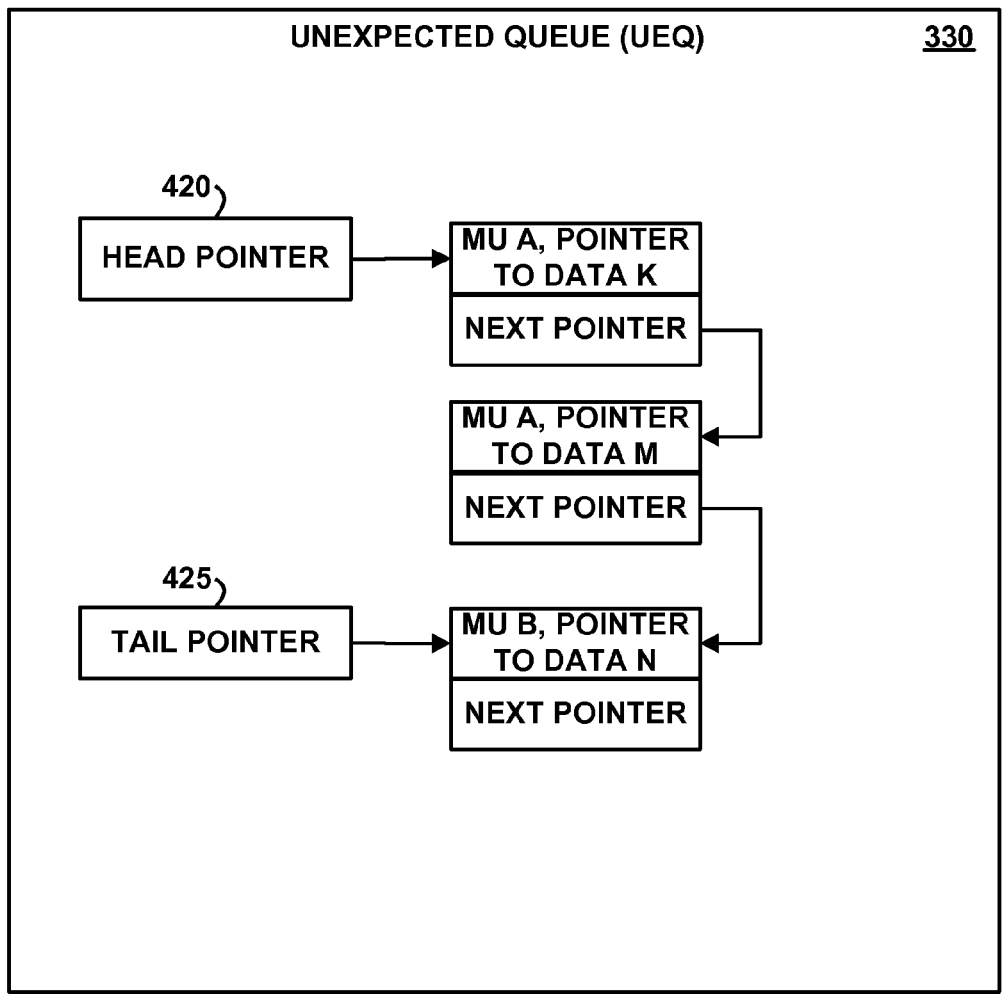
FIG. 4 depicts a block diagram of an example data structure for an unexpected queue, according to an embodiment of the invention.

FIG. 4 depicts a block diagram of an example data structure for an unexpected queue 330, according to an embodiment of the invention. In an embodiment, the unexpected queue 330 is illustrated as a linked list. A linked list is a data structure that comprises a series of entries (also called records or nodes) that does not have a fixed size. Instead, the linked list grows and shrinks as entries are added to and removed from the linked list, and memory is allocated to the linked list or deallocated from the linked list as the linked list grows or shrinks.

The entries in the linked list are not randomly accessible. Instead, each entry comprises a pointer or link to or address of the next entry in the series, with the next pointer of the final entry comprising a null value or other special value indicating that no more entries are present. Further, the entries are not necessarily located in contiguous memory locations, i.e., the entries may be stored in memory in a different order than the order of the entries as indicated by the order of their next pointers. Thus, to find a particular entry in the linked list, it must be searched from the head to the tail, in the order indicated by each entry's next pointer.

The head pointer 420 indicates or points at the head entry or comprises the address of the head entry, and the tail pointer 425 indicates or points at the tail entry or comprises the address of the tail entry. The linked list is illustrated as a singly-linked list with each entry comprising a next pointer that points at the next entry, starting at the head entry and proceeding to the tail entry. But, in another embodiment, the unexpected queue 330 is a doubly-linked list with each entry also comprising a back pointer that points at the previous entry, starting at the tail entry and proceeding to the head entry. New entries are added to the unexpected queue 330 at the tail, and entries are removed from the unexpected queue 330 at the head, but the head and tail designations are arbitrary, and in another embodiment, new entries are added to the unexpected queue 330 at the head, and entries are removed from the unexpected queue 330 at the tail.

The entries in the unexpected queue 330 comprise receive requests or messages received from source nodes via the network 155 that are unexpected, i.e., the unexpected queue 330 comprises requests or messages that have no matching receive request on the posted queue 335. Each receive request in the unexpected queue 330 comprises a data pointer, which indicates the message unit 103 and address within the reception FIFO buffer of the message unit 103 where the request data or message is located.

Figure 5:
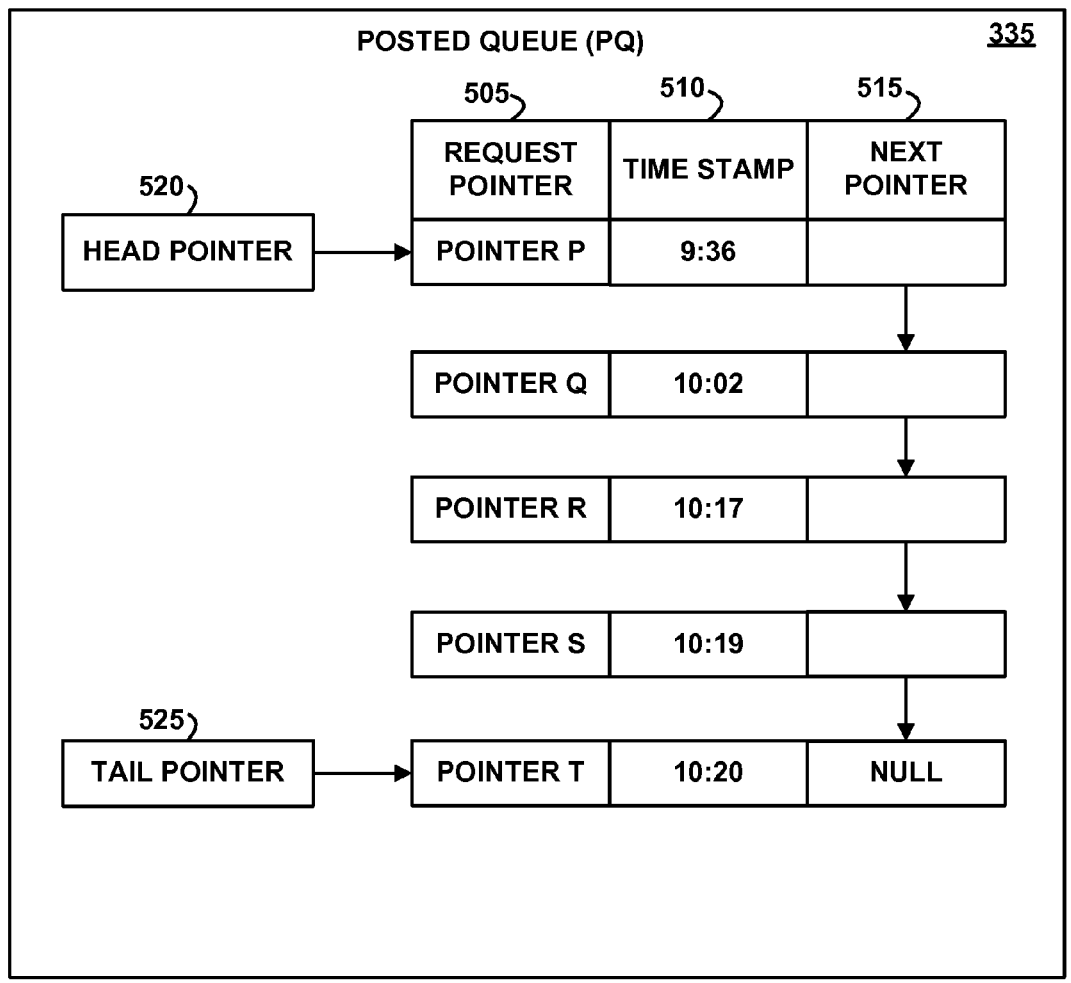
FIG. 5 depicts a block diagram of an example data structure for a posted queue, according to an embodiment of the invention.

FIG. 5 depicts a block diagram of an example data structure for a posted queue 335, according to an embodiment of the invention. In an embodiment, the posted queue 335 is implemented as a linked list, in order to facilitate the rapid removal of any arbitrary entry (not necessarily just the head or tail entries) from the posted queue 335, but in another embodiment, the posted queue 335 may be implemented as any appropriate data structure, such as a randomly accessible array. The organization and operation of the linked list is as previously described above.

The head pointer 520 indicates or points at the head entry or comprises the address of the head entry within the posted queue 335. The tail pointer 525 indicates or points at the tail entry or comprises the address of the tail entry within the posted queue 335. The tail entry is the most recent entry added to the posted queue 335. When the posted queue 335 is searched for an entry to remove from the posted queue 335, searching starts at the head entry. Each of the entries in the posted queue 335 comprises a receive request, which comprises a request pointer 505, a time stamp 510, and a next pointer 515. The request pointer 505 comprises an address of the respective receive request data 141 in the main memory 102 that describes the data that the receive request desires to receive. The time stamp 510 indicates the time that the respective receive request was created. The next pointer 515 comprises the address of the next entry in the series of entries in the posted queue 335.

Although the posted queue 335 is illustrated as a singly-linked list with next pointers in each entry pointing to the next entry, starting from the head entry and proceeding to the tail entry, in another embodiment, the posted queue 335 may be implemented as a doubly-linked list, also comprising back pointers in each entry, starting from the tail entry and proceeding to the head entry, with each back pointer pointing at the previous entry. In an embodiment, the designations "head" and "tail" are arbitrary and refer to opposite ends of the linked list.

The posted queue 335 comprises receive requests that were generated in response to function calls made by applications, added to the fast-post queue 340, and then later moved to the posted queue 335. The receive requests in posted queue 335 are requests to receive data from a source node 143 specified by the request data 141 that is pointed to by the request pointer 505.

Figure 6:
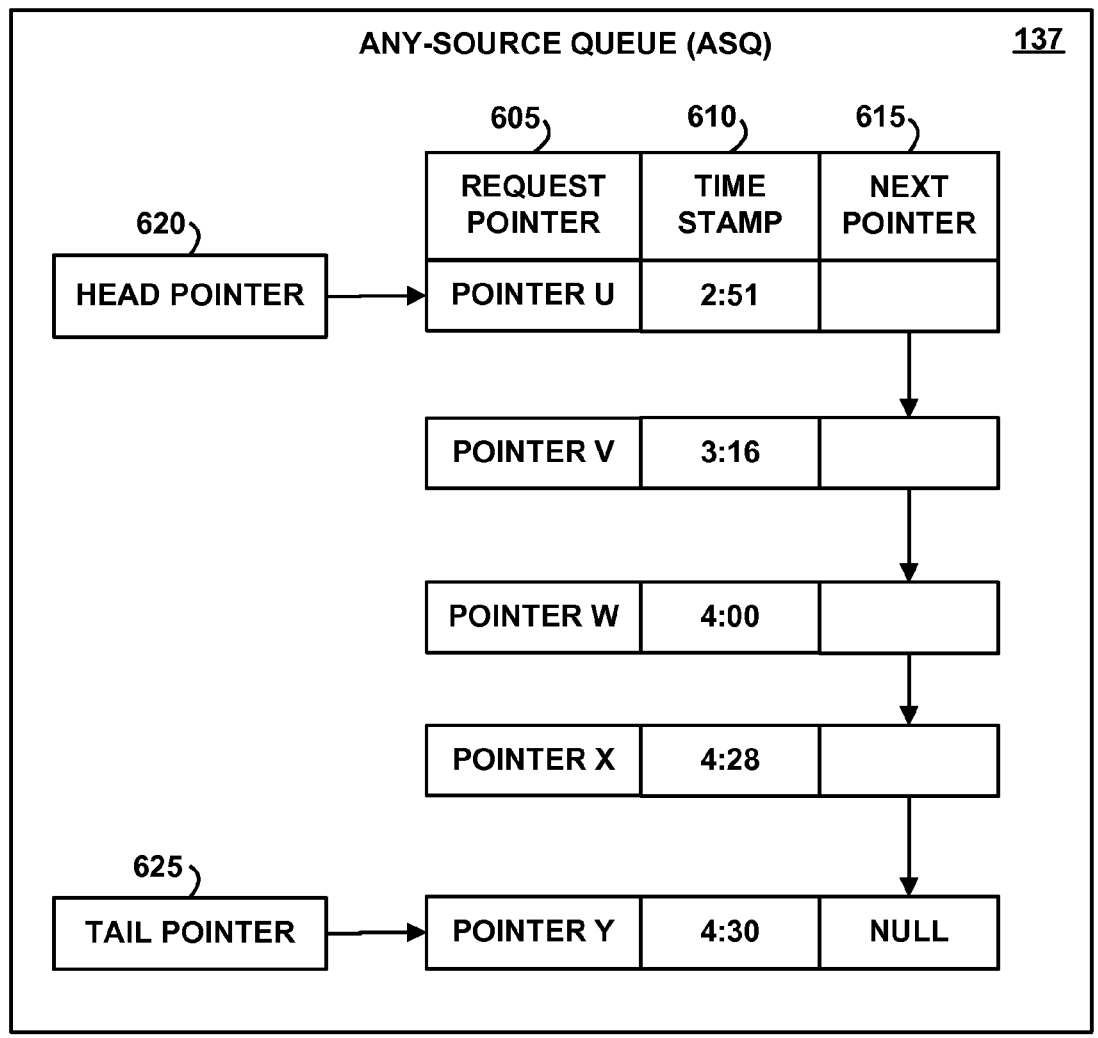
FIG. 6 depicts a block diagram of an example data structure for an any-source queue, according to an embodiment of the invention.

FIG. 6 depicts a block diagram of an example data structure for an any-source queue 137, according to an embodiment of the invention. The any-source queue 137 stores receive requests that were generated from information received from applications at a local destination node. Receive requests stored in the any-source queue 137 are commands or requests to receive messages from any source node connected via the network 155 and do not specify a particular source node.

The any-source queue 137 is illustrated as a linked list with a head pointer 620 and a tail pointer 625, but in another embodiment, the any-source queue 137 is implemented as a randomly accessible array. The head pointer 620 points at the head entry or comprises the address of the head entry within the any-source queue 137. The tail pointer 625 points a the tail entry or comprises the address of the tail entry within the any-source queue 137. The tail entry is the most recent entry added to the any-source queue 137. When the any-source queue 137 is searched for an entry to remove, searching starts at the head entry.

Each of the entries in the any-source queue 137 comprises a receive request, comprising a request pointer 605, a time stamp 610, and a next pointer 615. The request pointer 605 comprises an address of request data 141, which describes data that the receive request desires to receive. The time stamp 610 indicates the time that the respective receive request was created. The next pointer 615 comprises the address of the next entry in the any-source queue 137.

Figure 7:
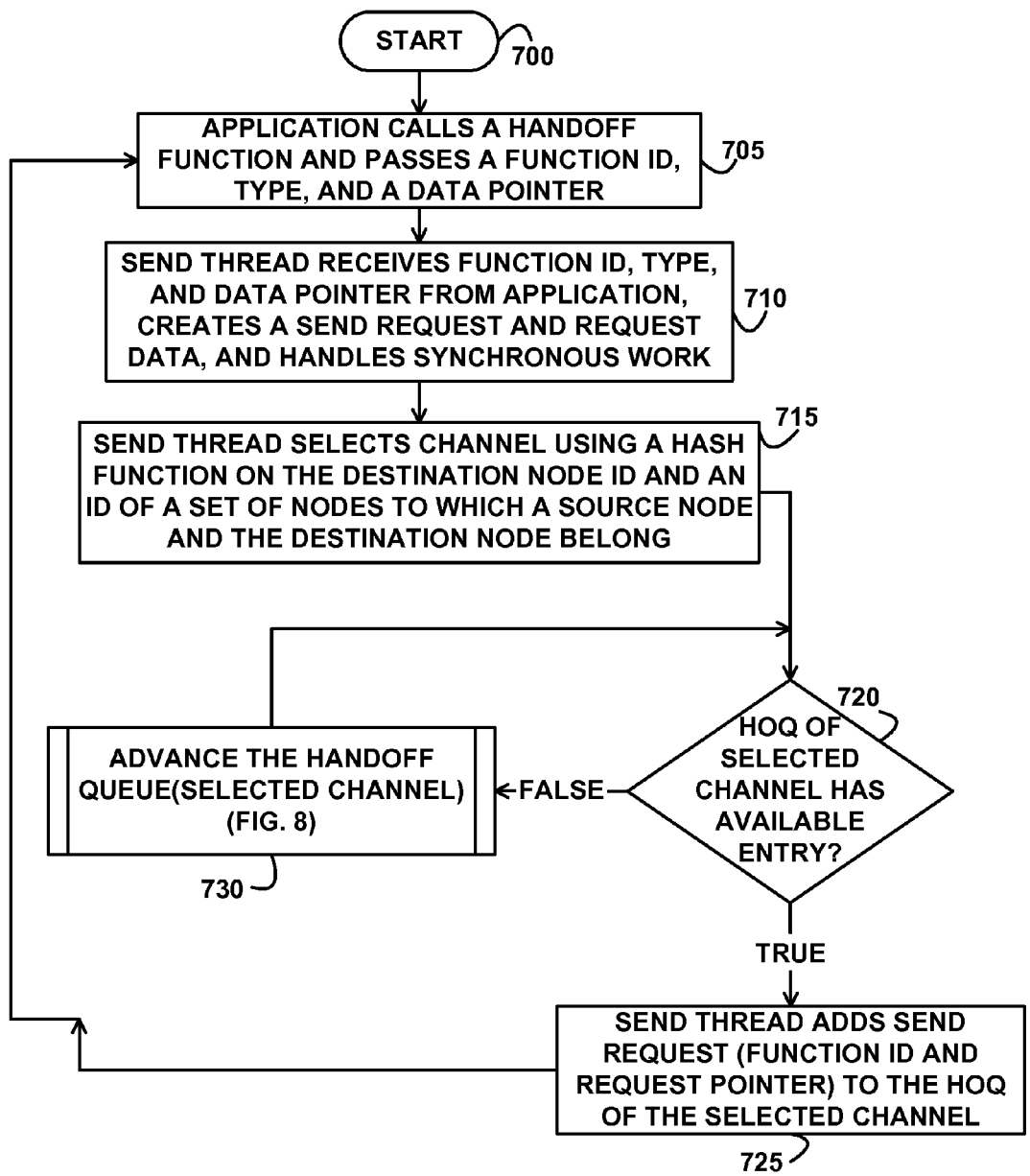
FIG. 7 depicts a flowchart of example processing for a send thread, according to an embodiment of the invention.

FIG. 7 depicts a flowchart of example processing for a send thread, according to an embodiment of the invention. Control begins at block 700. Control then continues to block 705 where an application 135 that executes at a source node calls a hand-off function and passes a function identifier, a type, and a data pointer. The call to the hand-off function is a request to send data identified by the data pointer to a destination node. The function identifier identifies one of the functions 139. The data pointer identifies or specifies an address of data that the application, by its call of the hand-off function, requests to send. In various embodiments, the application also sends any or all of an identifier of the destination node, a destination application, or a destination thread, either as a parameter on the hand-off function or included within the data pointed to by the data pointer. The type identifies a type, category, context, tag, rank, priority, or group to which the request, the destination node, or the data pointed to by the data pointer belong. In another embodiment, the destination identifier and the type are included in the data pointed to by the data pointer. In an embodiment, the application 135 executes within the send thread and the call to the hand-off function is a synchronous call, meaning that after invoking the hand-off function, the application 135 waits for the logic of the send thread of FIG. 7 to complete before continuing to the next instruction in the application 135 following the invocation of the hand-off function. In an embodiment, the call to the hand-off function causes the thread in which the application 135 executes to become a send thread 210.

Control then continues to block 710 where the send thread 210 receives the function identifier, type, node identifier, and data pointer from the application 135 and handles synchronous work. The send thread 210 creates a send request and request data 141 and copies the received destination node identifier into the node identifier 143, copies the received type into the type identifier 145, and copies the received data pointer into the data 147 of the request data 141.

Control then continues to block 715 where the send thread 210 selects one of the channels 136 using a hash function on the destination node identifier and an identifier of a set of nodes to which a source node identifier (identifying the node on which the send thread 210 executes) and the destination node identifier belong as input to the hash function. A channel identifier is output from the hand function. In other embodiments, the send thread 210 uses a round robin technique, a technique that selects the channel with the least number of entries on its hand-off queue 301, or any other appropriate technique for selecting a channel.

Control then continues to block 720 where the send thread 210 determines whether the hand-off queue of the selected channel is not full and comprises an available or unused entry. In an embodiment, the send thread 210 makes the determination of block 720 by determining whether the tail counter 320 is not equal to the size of the hand-off queue minus the head counter 325.

If the determination at block 720 is true, then the hand-off queue 301 of the selected channel has an available entry and is not full, so control continues to block 725 where the send thread 210 increments the head counter 325 to the next entry in the hand-off queue 301 (mod the size of the hand-off queue 301) and adds the received function identifier and a request pointer that points to or contains the address of the created request data 141 to the hand-off queue of the selected channel at the entry within the hand-off queue 301 that is pointed to by the head counter 325 at the head of the hand-off queue 301.

Control then returns to block 705 where the same or a different application calls the hand-off function and passes the same or a different function identifier and the same or a different data pointer, as previously described above.

Figure 8:
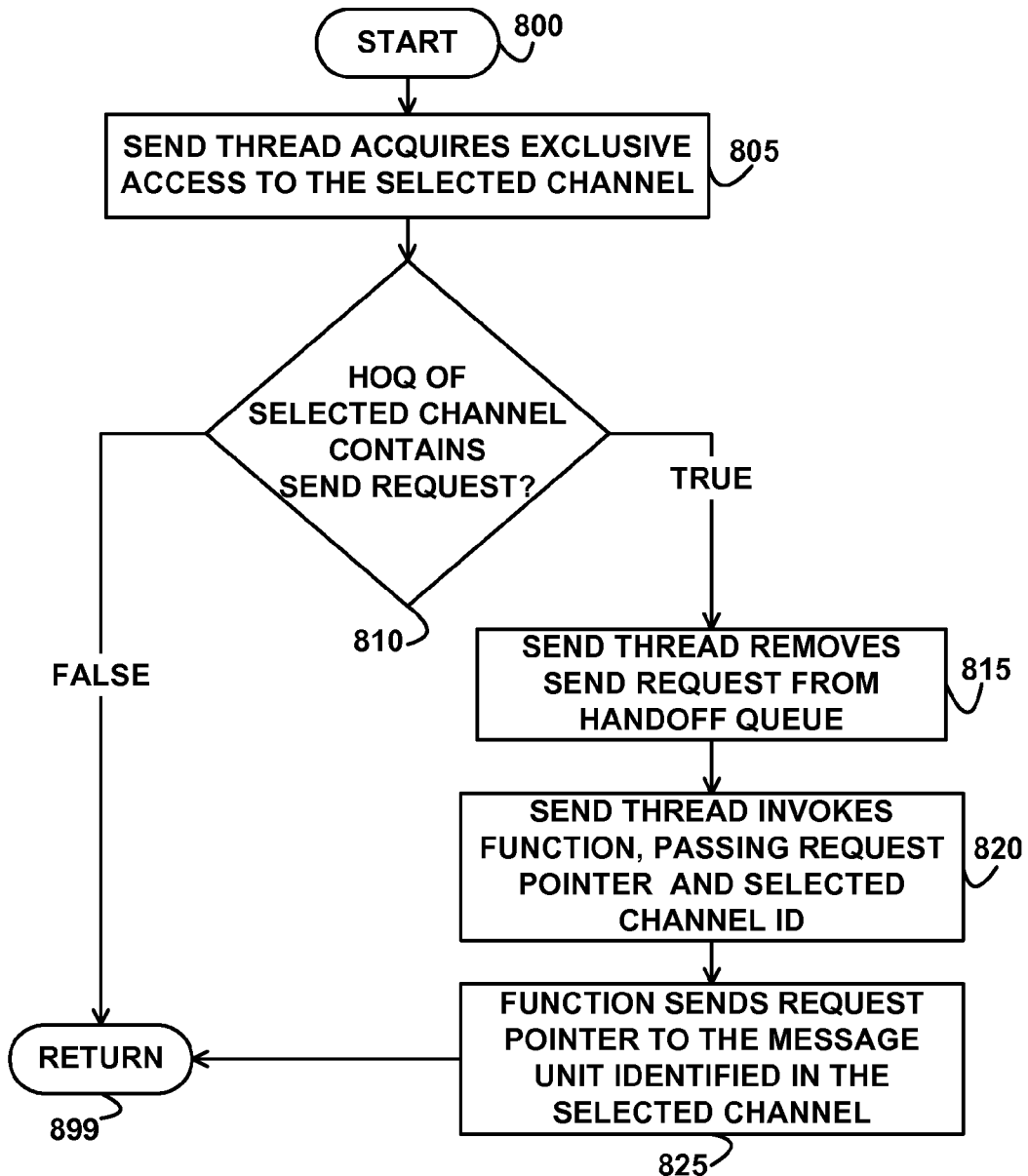
FIG. 8 depicts a flowchart of example processing for advancing a hand-off queue, according to an embodiment of the invention.

If the determination at block 720 is false, then control continues to block 730 where the send thread 210 advances the hand-off queue of the selected channel, as further described below with reference to FIG. 8. In an embodiment, although the logic of FIGS. 7 and 8 are both referred to as the send thread, the logic of FIGS. 7 and 8 is performed by different threads. That is, the logic of FIG. 8 is performed asynchronously in a different thread from the logic of FIG. 7, so that after requesting the hand-off queue to be advanced in block 730, the control flow of the logic of FIG. 7 returns to block 720, as previously described above, without waiting for the advance of the hand-off queue, as illustrated in FIG. 8, to complete. In another embodiment, the send thread logic of FIGS. 7 and 8 is performed by the same thread.

Because the hand-off queue 301 comprises preallocated entries and is randomly accessible via the counters (indexes) 320 and 325, adding a send request to the hand-off queue (at block 725) is faster than would be adding a send request to a linked-list queue, which requires memory allocation and pointer operations. This fast adding of a send request to the hand-off queue 301 allows the application 135 to execute synchronously within the same thread as the send thread 210 and allows the send thread 210 to quickly give control back to the application (returning to block 705 from block 725), so that the application 135 may perform other processing or perform another hand-off invocation. Also, by the send thread (FIG. 7) and the injection thread (FIG. 9) executing asynchronously from each other in different threads, the application 135 need not wait for send requests to be sent the message unit.

FIG. 8 depicts a flowchart of example processing for advancing a hand-off queue, according to an embodiment of the invention. Control begins at block 800. Control then continues to block 805 where the send thread 210 acquires exclusive access to the selected channel, which prevents any other thread from reading/writing to/from the selected channel. If exclusive access to the selected channel is not available, then the send thread 210 waits at block 805 until exclusive access is available.

Control then continues to block 810 where the send thread 210 determines whether the hand-off queue 301 of the selected channel is not empty and contains a valid entry that comprises a send request. In an embodiment, the send thread 210 makes the determination of block 810 by determining whether the tail counter of the hand-off queue 301 of the selected channel is not equal to the head counter of the hand-off queue 301 of the selected channel. If the determination at block 810 is true, then the tail counter is not equal to the head counter and the hand-off queue 301 of the selected channel contains a valid entry that comprises a send request, so control continues to block 815 where the send thread 210 removes the send request from the tail of the hand-off queue 301 at the location pointed to by the tail counter and then increments the tail counter by the size of the removed send request mod the size of the hand-off queue 301.

Control then continues to block 820 where the send thread 210 invokes the function 139 identified by the function identifier 309 of the removed entry, passing the request pointer 310 of the removed send request and an identifier of the selected channel. Control then continues to block 825 where the function 139 identified by the function identifier 309 in the removed send request sends the request pointer 310 of the send request to the message unit 103 identified in the message identifier 345 of selected channel. That is, the send thread sends the send request to the message unit 103 of the selected channel. Control then continues to block 899 where the logic of FIG. 8 returns.

If the determination at block 810 is false, then the hand-off queue 301 of the selected channel is empty and does not comprise a valid entry that comprises a send request, so control continues to block 899 where the logic of FIG. 8 returns.

Figure 9:
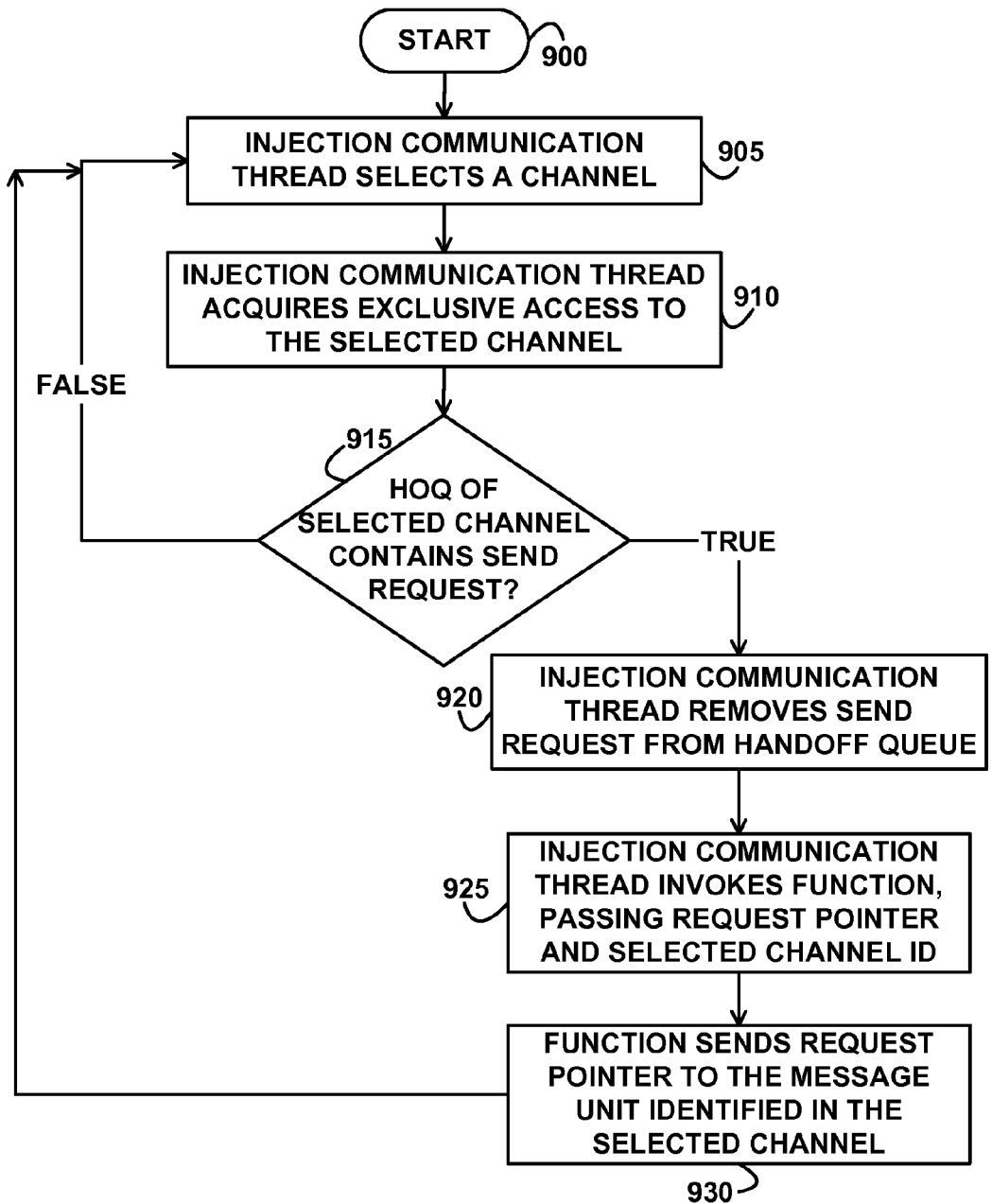
FIG. 9 depicts a flowchart of example processing for an injection communication thread, according to an embodiment of the invention.

FIG. 9 depicts a flowchart of example processing for an injection communication thread, according to an embodiment of the invention. In an embodiment, the logic of FIG. 9 executes in response to an application invoking a wait function, which causes the thread in which the application executes to search for work that needs to be performed. If the hand-off queue contains a send request, then, in an embodiment, the thread may become the injection communication thread and perform the logic of FIG. 9.

Control begins at block 900. Control then continues to block 905 where the injection communication thread 215 selects a channel 136. In various embodiments, the injection communication thread 215 uses a round robin technique, a technique that selects the channel with the most number of entries on its queues, a technique that selects the channel with the most amount of data requested to be sent by its send requests, or any other appropriate technique for selecting a channel from among the various available channels.

Control then continues to block 910 where the injection communication thread 215 acquires exclusive access to the selected channel, which prevents any other thread from reading/writing to/from the selected channel. If exclusive access to the selected channel is not available, then the send thread 210 waits at block 910 until exclusive access is available.

Control then continues to block 915 where the injection communication thread 215 determines whether the hand-off queue 301 of the selected channel is not empty and contains a valid entry that comprises a send request. In an embodiment, the injection communication thread 215 makes the determination of block 915 by determining whether the tail counter of the hand-off queue 301 of the selected channel is not equal to the head counter of the hand-off queue 301 of the selected channel. If the determination at block 915 is true, then the tail counter is not equal to the head counter and the hand-off queue 301 of the selected channel is not empty and contains a valid entry that comprises a send request, so control continues to block 920 where the injection communication thread 215 removes the send request from the tail of the hand-off queue at the location pointed to by the tail counter and then increments the tail counter by the size of the removed send request mod the size of the hand-off queue 301.

Control then continues to block 925 where the injection communication thread 215 invokes the function, passing the request pointer 310 from the removed send request and the selected channel identifier. Control then continues to block 930 where the function 139 identified by the function identifier 309 of the removed send request sends the request pointer 310 of the removed send request to the message unit 103 identified in the message identifier 345 of selected channel.

Control then returns to block 905 where the injection communication thread 215 selects another channel, either the same or a different channel as the one selected by the previous iteration of the loop that starts at block 905. Control then continues to block 910 where the newly selected channel is processed, as previously described above.

If the determination at block 915 is false, then the tail counter is equal to the head counter and the hand-off queue 301 of the selected channel is empty or does not contain a valid entry that comprises a send request, so control returns to block 905 where the injection communication thread 215 selects another channel, as previously described above.

Figure 10:
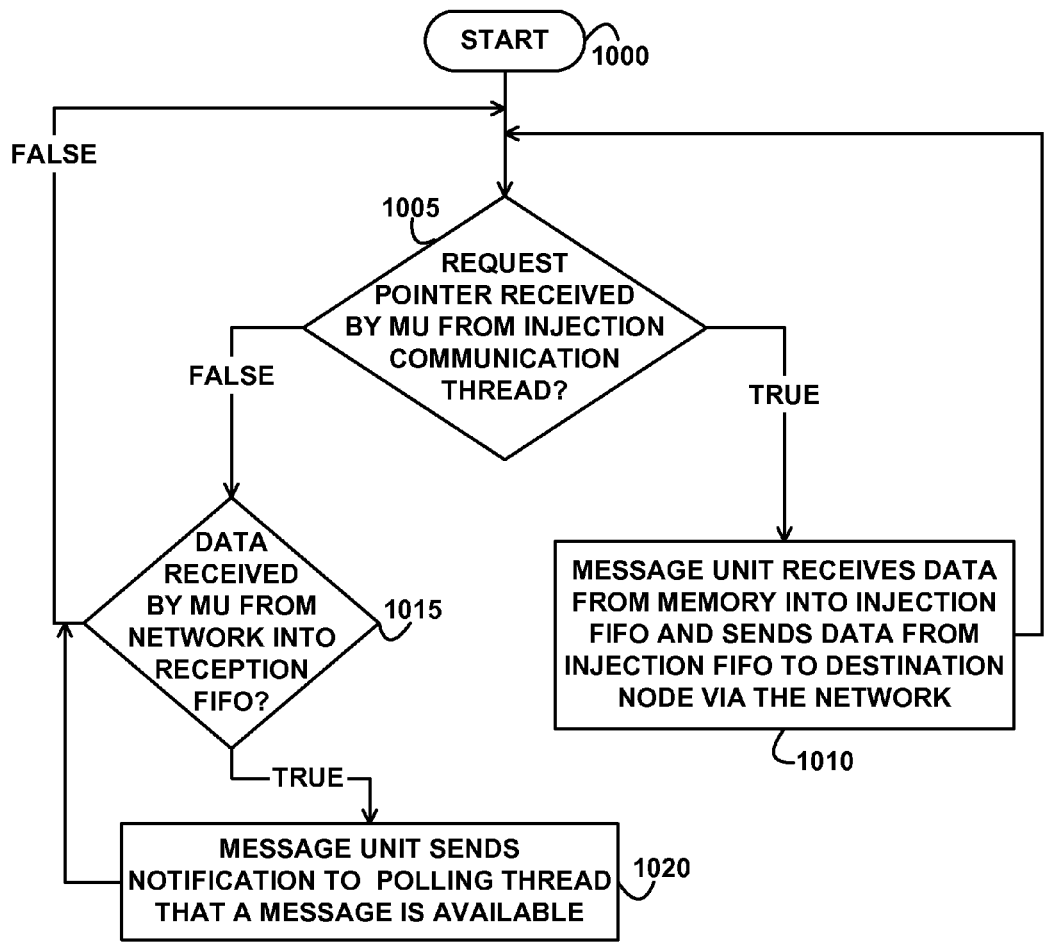
FIG. 10 depicts a flowchart of example processing for a message unit, according to an embodiment of the invention.

FIG. 10 depicts a flowchart of example processing for a message unit, according to an embodiment of the invention. The logic of FIG. 10 is performed by each of the plurality of messages units 103, and the message units 103 perform their logic asynchronously from the execution of the threads 205. Control begins at block 1000. Control then continues to block 1005 where the message unit 103 determines whether a request pointer that points at request data 141 was received by the message unit 103 from the injection communication thread 215. If the determination at block 1005 is true, then a request pointer was received by the message unit 103 from the injection communication thread 215, so control continues to block 1010 where the message unit 103 receives the data 147 or the data at the address indicated by the data 147 (found within the request data 141 pointed to by the received request pointer) from the main memory 102 into the injection FIFO buffer of the message unit 103 and sends the send request and the data from injection FIFO buffer to the destination node (indicated in the node identifier 143 within the request data 141 pointed to by the received request pointer) via the network 155. Control then returns to block 1005 where the message unit 103 again determines whether a request pointer was received, as previously described above.

If the determination at block 1005 is false, then a request pointer was not received by the message unit 103 from the injection communication thread 215, so control continues to block 1015 where the message unit 103 determines whether message data was received by the message unit 103 from a source node 100 via the network 155 into the reception FIFO buffer. If the determination at block 1015 is true, then message data was received by the message unit 103 from a source node 100 via the network 155 into the reception FIFO buffer, so control continues to block 1020 where the message unit 103 sends a notification to the polling thread, indicating that a received message is available.

Control then returns to block 1005 where the message unit 103 again determines whether a request pointer was received, as previously described above.

If the determination at block 1015 is false, then message data was not received by message unit 103 from a source node via the network 155 into the reception FIFO buffer, so control returns to block 1005 where the message unit 103 again determines whether a request pointer was received, as previously described above.

Figure 11:
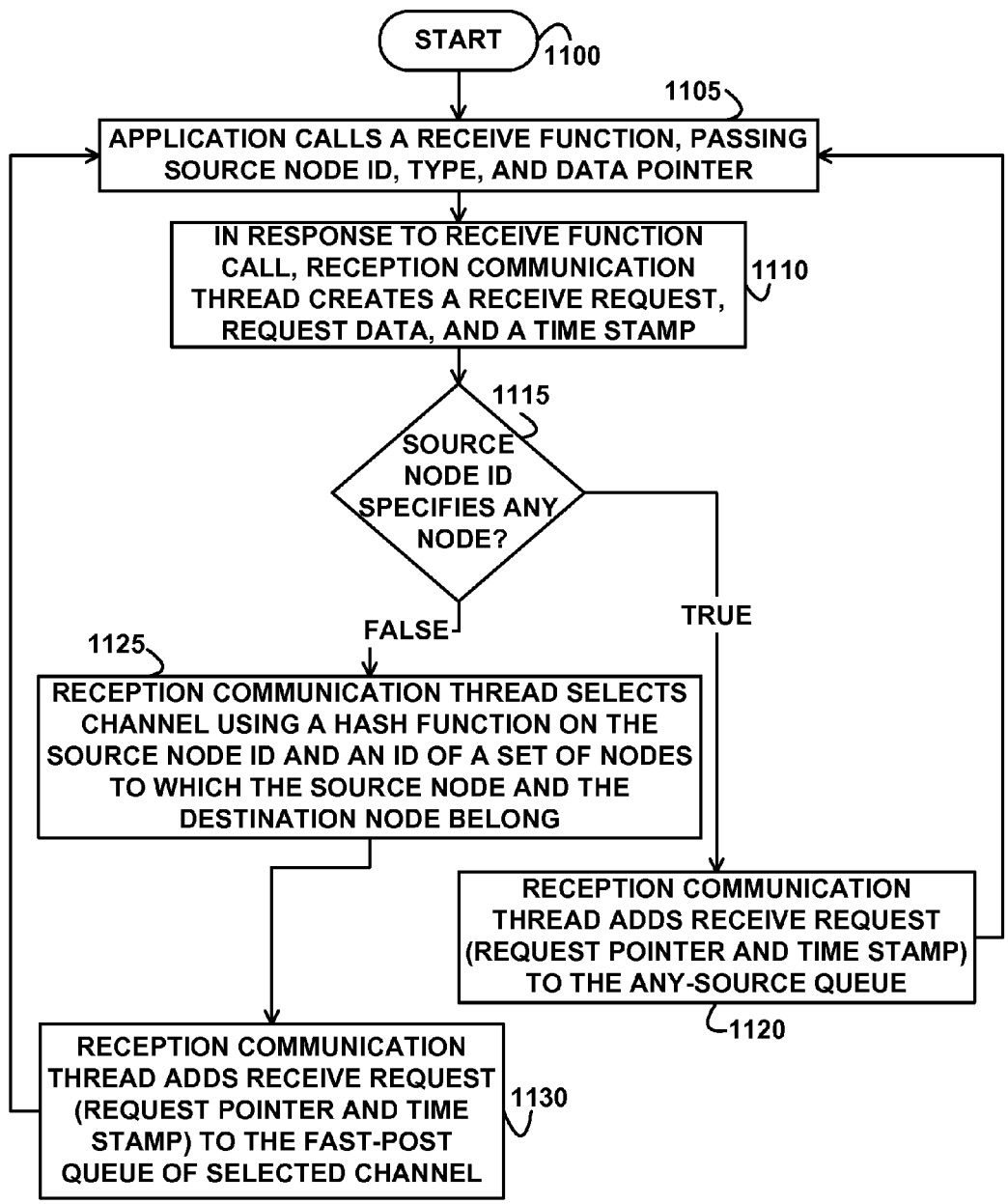
FIG. 11 depicts a flowchart of example processing for a reception communication thread, according to an embodiment of the invention.

FIG. 11 depicts a flowchart of example processing for a reception communication thread, according to an embodiment of the invention. Control begins at block 1100.

Control then continues to block 1105 where an application 135 that executes at a destination node calls a receive function, passing a source node identifier, a type, and a data pointer. In an embodiment, the call to the receive function causes the thread in which the application executes to become a reception communication thread. The source node identifier identifies a source node from which that the receive function requests to receive data. In various embodiments, the source node identifier may identify a specific, uniquely-identified node, a set of source nodes, a category of nodes, or may specify any node connected to the destination node via the network 155. The type describes or categorizes the data to be received and/or the source node from which the data is requested to be received. In various embodiments, the type identifies a type, category, context, tag, rank, priority, or group to which the source node, or the requested data belongs. The data pointer comprises an address or location within main memory 102 where the application 135 requests to receive the data.

Control then continues to block 1110 where, in response to the receive function call, the reception communication thread 220 creates a receive request, creates request data 141, copies the received source node identifier into the node identifier 143 of the created request data 141, copies the received type into the type 145 of the created request data 141, and copies the received data pointer into the data 147 into the created receive request data 141. The reception communication thread 220 further creates a time stamp that represents the time that the receive request was created.

Control then continues to block 1115 where the reception communication thread 220 determines whether the received source node identifier specifies any node, i.e., the source node identifier does not identify a specific source node. If the determination at block 1115 is true, then the request queue identifier specifies any node, so control continues to block 1120 where the reception communication thread 220 adds the created receive request to a next entry in the any-source queue 137 that points to the created request data 141. That is, the reception communication thread 220 allocates memory for the next entry. The reception communication thread 220 finds the tail entry that is pointed at by the tail pointer 625. The reception communication thread 220 sets the next pointer 615 in the found tail entry to point to the allocated next entry and sets the tail pointer 625 to point to the allocated next entry, as the new tail entry. The reception communication thread 220 further sets the time stamp 610 in the next entry to the created time stamp, sets the request pointer 605 in the next entry to the address of the created request data 141, and sets the next pointer 615 in the next entry to null.

Control then returns to block 1105 where a same or different application calls a receive function, passing a same or different source node identifier, type, and data pointer, as previously described above.

If the determination at block 1115 is false, then received source node identifier specifies a specific uniquely identified source node, a set of nodes, or a category of nodes, so control continues to block 1125 where the reception communication thread 220 selects a channel using a hash function on the source node identifier and an identifier of a set of nodes to which a source node identifier and the destination node identifier belong. In other embodiments, the send thread 210 uses a round robin technique, a technique that selects the channel with the least number of entries on its hand-off queue 301, or any other appropriate technique for selecting a channel.

Control then continues to block 1130 where the reception communication thread 220 adds the receive request to the fast-post queue 340 that points to the created request data 141. That is, if the fast-post queue 340 is full, the reception-communication thread determines if the fast-post queue 340 is locked. If the fast-post queue 340 is not locked, the reception communication thread 220 acquires exclusive access to the fast-post queue 340 via a lock. The reception communication thread 220 then changes into the polling thread 225 and removes a number of receive requests from the fast-post queue and adds them to the posted-queue or copies their message data, as further described below with reference to FIG. 13, blocks 1310, 1315, 1320, and 1325. The polling thread 225 then reverts back to the reception communication thread 220. If the fast-post-queue 340 is locked by another thread, then the reception communication thread 220 waits for the fast post-queue 340 to become not full or unlocked. Once the fast-post queue 340 is not full, then the reception communication thread 220 increments the head counter 352 to the next entry in the fast-post queue 340 mod the size of the fast-post queue 340, sets the pointer in the next entry to the address of the created request data and sets the time stamp in the entry to the created time stamp.

Control then returns to block 1105 where a same or different application calls a receive function, passing a same or different source node identifier, type, and data pointer, as previously described above.

Because the fast-post queue 340 comprises preallocated entries and is randomly accessible via the counters (indexes) 350 and 352, adding a receive request to the fast-post queue 340 (at block 1130) is faster than would be adding a receive request to the posted queue 335 directly, which requires memory allocation and pointer operations. This fast adding of a receive request to the fast-post queue 340 allows the application 135 to execute synchronously within the same thread as the reception communication thread 220 and allows the reception communication thread 220 to quickly give control back to the application 135 (returning from block 1130 to bock 1105), so that the application 135 may perform other processing or perform another receive function invocation. Also, by the reception communication thread 220 (FIG. 11) and the polling thread 225 (FIGS. 12 and 13) executing asynchronously from each other in different threads, the application 135 need not wait for receive requests to be moved from the fast-post queue 340 to the posted queue 335 and need not wait for messages to arrive from a source node via the network 155.

Figure 12:
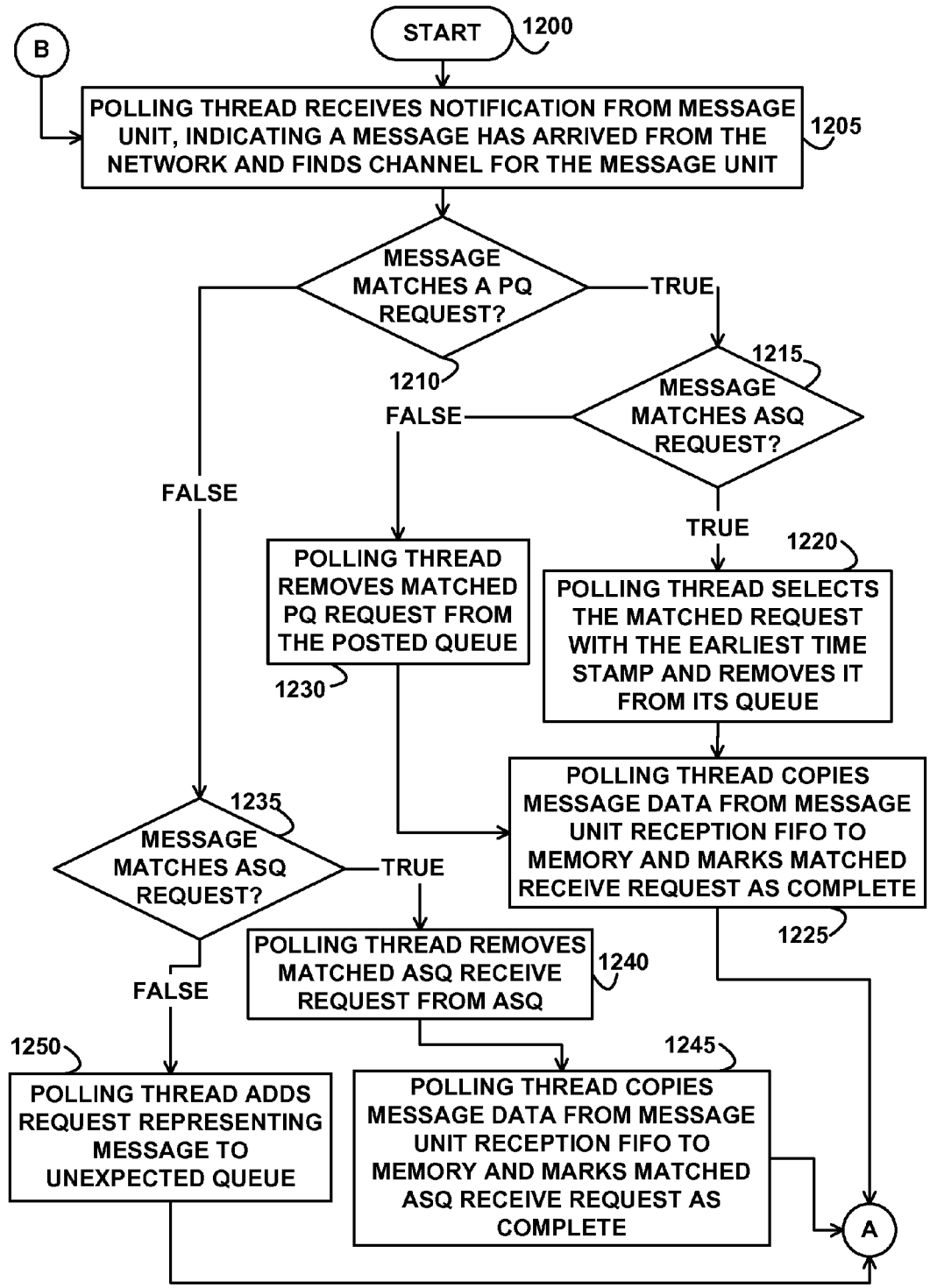
FIG. 12 depicts a flowchart of example processing for a polling thread, according to an embodiment of the invention.
Figure 13:
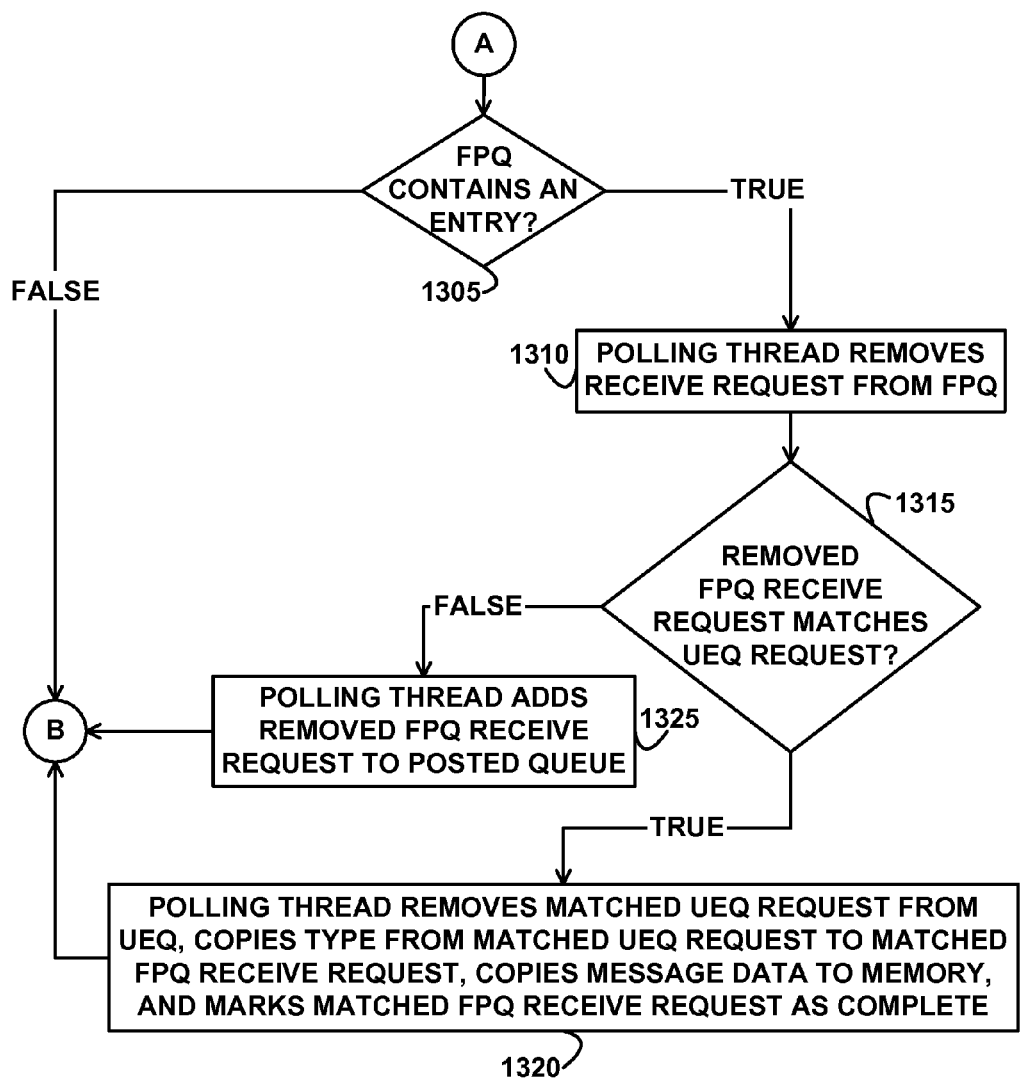
FIG. 13 depicts a flowchart of further example processing for a polling thread, according to an embodiment of the invention.

FIGS. 12 and 13 depict flowcharts of example processing for a polling thread, according to an embodiment of the invention. In an embodiment, the logic of FIGS. 12 and 13 executes in response to an application 135 invoking a wait function, which causes the thread in which the application 135 executes to search for work that needs to be performed. If the message unit 103 has sent a notification, then, in an embodiment, the thread may become the polling thread 225 and performs the logic of FIGS. 12 and 13.

Control begins at block 1200 of FIG. 12. Control then continues to block 1205 where the polling thread 225 receives a notification from the message unit 103, indicating that a received message has arrived from the network 155. The polling thread 225 finds the channel 136 with a message unit identifier 345 that matches (is identical to) the identifier of the message unit 103 that sent the notification.

Control then continues to block 1210 where, in response to the receipt of the notification from the message unit, the polling thread 225 determines whether the received message that arrived from the network 155 matches a receive request in the posted queue 335. In an embodiment, the polling thread 225 makes the determination of block 1210 by searching the posted queue 335, staring at the head entry and proceeding toward the tail entry. The polling thread 225 compares the source identifier 143 and/or the type 145 in the request data 141 pointed to by the request pointers 505 in the receive requests in the posted queue 335 to the identifier of the source node that sent the message and/or the type of the message. In various embodiments, the message unit 103 supplies the identifier of the source node that sent the message and the type of the message to the polling thread 225, or the source identifier and/or the type of the message are contained in the received message.

If the determination at block 1210 is true, then the received message matches a receive request in the posted queue 335 (the source identifier and/or type match), so control continues to block 1215 where the polling thread 225 determines whether the received message matches a receive request in the any-source queue 137. In an embodiment, the polling thread 225 makes the determination of block 1215 by searching the any-source queue 137, starting at the head entry and proceeding toward the tail entry. The polling thread 225 compares the source identifier 143 and/or the type 145 in the request data 141 pointed to by the request pointers 605 in the receive requests in the any-source queue 137 to the identifier of the source node that sent the received message and/or the type of the received message. In various embodiments, a receive message may match both a receive request on the posted queue and a receive request on the any-source queue because the same or different applications invoke the receive function (as previously described above with reference to FIG. 11) multiple times, passing types that are identical but source node identifiers that are different (some invocations specifying a particular source node while other invocations with the same type specify any source node).

If the determination at block 1215 is true, then the received message matches a received request that is in the any-source queue 137 (the source identifier and/or type match), so control continues to block 1220 where the polling thread 225 selects the matched received request with the earliest time stamp and removes it from its queue. That is, if the matched receive request in the any-source queue 137 has an earlier time stamp than the matched receive request in the posted queue 335, then the polling thread 225 removes the matched receive request from the any-source queue 137. But, if the matched received request in the posted queue 335 has an earlier or the same time stamp as the matched receive request in the any-source queue 137, then the polling thread 225 removes the matched receive request from the posted queue 335. The polling thread 225 removes the matched receive request from either the posted queue 335 or the any-source queue 137 by updating the next pointer of the receive request previous to the removed receive request to point to the entry following the removed receive request.

Control then continues to block 1225 where the polling thread 225 copies the message data in the received message from the reception FIFO buffer of the message unit 103 to the location in the main memory 102 that is pointed to by the data 147 in the request data 141 that is pointed to by the request pointer in the removed matched receive request and marks the removed matched request as complete. The application 135 may call a test or wait function, which determines whether or not receive requests are complete by checking whether the receive requests are marked as complete.

Control then continues to block 1305 of FIG. 13 where the polling thread 225 determines whether the fast-post queue 340 contains a receive request (is not empty). In an embodiment, the polling thread 225 performs the determination of block 1305 by determining whether the tail pointer is not equal to the head pointer. If the determination at block 1305 is true, then the fast-post queue 340 contains a receive request and is not empty, so control continues to block 1310 where the polling thread 225 removes the receive request from the fast-post queue 340 that is pointed to by the tail counter and increments the tail counter by the size of the removed receive request mod the size of the fast-post queue 340.

Control then continues to block 1315 where the polling thread 225 determines whether the removed receive request matches a receive request in the unexpected queue 330. That is, the polling thread 225 finds the removed receive request and determines whether the source node identifier 143 and the type 145 in the request data 141 pointed to by the removed receive request match the source node identifier 143 and type 145 of request data pointed to by a receive request in the unexpected queue 330. The polling thread 225 searches the unexpected queue 330 starting at the head entry (pointed to by the head pointer 420) and proceeding until the polling thread 225 either finds a matched receive request in the unexpected queue 330 or reaches the tail entry (pointed to by the tail pointer 425) of the unexpected queue 330.

If the determination at block 1315 is true, then the removed receive request from the fast-post queue 340 matches a receive request in the unexpected queue 330, so control continues to block 1320 where the polling thread 225 removes the matched request from the unexpected queue 330, copies the type from the request data of the removed request from the unexpected queue 330 to the request data of the matched receive request that was removed from the fast-post queue 340, copies the message data from the removed matched unexpected queue request to the location in the memory 102 that is pointed to by the data 147 of the removed receive request from the fast-post queue 340, and marks the receive request that was removed from the fast-post queue 340 as complete. Control then returns to block 1205 where the where the polling thread 225 receives another notification from the message unit 103, indicating that another message has arrived from the network 155, as previously described above.

Referring again to FIG. 13, if the determination at block 1315 is false, then the removed receive request from the fast-post queue 340 does not match a receive request from the unexpected queue 330, so control continues to block 1325 where the polling thread 225 adds the removed receive request from the fast-post queue 340 to the posted queue 335. Control then returns to block 1205 where the polling thread 225 receives another notification from the message unit 103, indicating that another message has arrived from the network 155, as previously described above.

Referring again to FIG. 13, if the determination at block 1305 is false, then the fast-post queue 340 does not contain a receive request (the fast-post queue 340 is empty, so control returns to block 1205 where the polling thread 225 receives another notification from the message unit 103, indicating that another message has arrived from the network 155, as previously described above.

If the determination at block 1215 is false, then the received message does not match any receive request in the any-source queue 137, so control continues to block 1230 where the polling thread 225 removes the matched receive request from the posted queue 335. Control then continues to block 1225, as previously described above.

If the determination at block 1210 is false, then the message does not match a receive request in the posted queue 335, so control continues to block 1235 where the polling thread 225 determines whether the message matches a receive request in the any-source queue 137. In an embodiment, the polling thread 225 makes the determination of block 1235 by searching the any-source queue 137, starting at the head entry and proceeding toward the tail entry. The polling thread 225 compares the source identifier 143 and/or the type 145 in the request data 141 pointed to by the request pointers 605 in the receive requests in the any-source queue 137 to the identifier of the source node that sent the received message and/or the type of the received message.

If the determination at block 1235 is true, then the message does match a receive request in the any-source queue, so control continues to block 1240 where the polling thread 225 removes the matched receive request from the any-source queue 137. The polling thread 225 removes the matched receive request from the any-source queue 137 by updating the next pointer of the receive request previous to the removed receive request to point to the entry following the removed receive request. Control then continues to block 1245 where the polling thread 225 copies the message data in the received message from the reception FIFO buffer of the message unit 103 to the location in the main memory 102 that is pointed to by the data 147 in the request data 141 that is pointed to by the request pointer in the removed matched receive request and marks the removed matched request as complete. Control then continues to block 1305 of FIG. 13, as previously described above.

Referring again to FIG. 12, if the determination at block 1235 is false, then the message does not match a receive request in the any-source queue, so control continues to block 1250 where the polling thread 225 adds a request that represents the received message to the unexpected queue 330. Control then continues to block 1305 of FIG. 13, as previously described above.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A method comprising:
   receiving, by a reception thread, a source node identifier, a type, and a data pointer;
   creating, by the reception thread, a first receive request in response to the receiving;
   selecting, by the reception thread, a selected channel from among a plurality of channels, wherein the selected channel comprises a fast-post queue that is randomly accessible, and adding the first receive request to the fast-post queue if the source node identifier specifies a source node;
   adding, by the reception thread, the first receive request to an any-source queue that comprises a first linked list if the source node identifier does not specify a source node; and
   if a message received from a network does not match a second receive request on a posted queue and the message does not match the first receive request on the any-source queue, adding, by a polling thread, a third receive request that represents the message to an unexpected queue.

2. The method of claim 1, further comprising:
   if the message matches the second receive request on the posted queue and the message does not match the first receive request on the any-source queue, removing, by the polling thread, the second receive request from the posted queue, and copying message data from a message unit to a memory location identified by the second receive request.

3. The method of claim 2, further comprising:
   if the message matches the second receive request on the posted queue, the message matches the first receive request on the any-source queue, and the first receive request on the any source queue was received at an earlier time than the second receive request on the posted queue, removing, by the polling thread, the first receive request from the any-source queue, and copying the message data from the message unit to a memory location identified by the first receive request that was removed from the any-source queue.

4. The method of claim 3, further comprising:
   if the message matches the second receive request on the posted queue, the message matches the first receive request on the any-source queue, and the second receive request on the posted queue was received at an earlier time than the first receive request on the any-source queue, removing, by the polling thread, the second receive request from the posted queue, and copying the message data from the message unit to the memory location identified by the second receive request that was removed from the posted queue; and
   if the message does not match the second receive request on the posted queue, the message matches the first receive request on the any-source queue, removing, by the polling thread, the first receive request from the any-source queue, and copying the message data from the message unit to the memory location identified by the first receive request that was removed from the any-source queue.

5. The method of claim 3, further comprising:
   if the fast-post queue contains the first receive request, removing, by the polling thread, the first receive request from the fast-post queue;
   if the first receive request that was removed from the fast-post queue matches the third receive request on the unexpected queue, removing, by the polling thread, the third receive request from the unexpected queue and copying the message data from the message unit to the memory location identified by the first receive request that was removed from the fast-post queue; and
   if the first receive request that was removed from the fast-post queue does not match the third receive request on the unexpected queue, adding, by the polling thread, the first receive request that was removed from the fast-post queue to the posted queue.

6. The method of claim 5, wherein the adding the first receive request to the fast-post queue executes faster than the adding of the first receive request to the posted queue, wherein the posted queue comprises a second linked list.

7. The method of claim 1, wherein the source node identifier, the type, and the data pointer are received from an application that executes synchronously within the reception thread.

8. The method of claim 1, wherein the reception thread and the polling thread execute asynchronously.

9. A computer-readable storage medium encoded with instructions, wherein the instructions when executed comprise:
   receiving, by a reception thread, a source node identifier, a type, and a data pointer;
   creating, by the reception thread, a first receive request in response to the receiving;
   selecting, by the reception thread, a selected channel from among a plurality of channels, wherein the selected channel comprises a fast-post queue that is randomly accessible, and adding the first receive request to the fast-post queue if the source node identifier specifies a source node;
   adding, by the reception thread, the first receive request to an any-source queue that comprises a first linked list if the source node identifier does not specify a source node; and
   if a message received from a network does not match a second receive request on a posted queue and the message does not match the first receive request on the any-source queue, adding, by a polling thread, a third receive request that represents the message to an unexpected queue.

10. The computer-readable storage medium of claim 9, further comprising:

if the message matches the second receive request on the posted queue and the message does not match the first receive request on the any-source queue, removing, by the polling thread, the second receive request from the posted queue, and copying message data from a message unit to a memory location identified by the second receive request.

11. The computer-readable storage medium of claim 10, further comprising:

if the message matches the second receive request on the posted queue, the message matches the first receive request on the any-source queue, and the first receive request on the any-source queue was received at an earlier time than the second receive request on the posted queue, removing, by the polling thread, the first receive request from the any-source queue, and copying the message data from the message unit to a memory location identified by the first receive request that was removed from the any-source queue.

12. The computer-readable storage medium of claim 11, further comprising:

if the message matches the second receive request on the posted queue, the message matches the first receive request on the any-source queue, and the second receive request on the posted queue was received at an earlier time than the first receive request on the any-source queue, removing, by the polling thread, the second receive request from the posted queue, and copying the message data from the message unit to the memory location identified by the second receive request that was removed from the posted, queue.

13. The computer-readable storage medium of claim 12, further comprising:

if the message does not match the second receive request on the posted queue, the message matches the first receive request on the any-source queue, removing, by the polling thread, the first receive request from the any-source queue, and copying the message data from the message unit to the memory location identified by the first receive request that was removed from the any-source queue.

14. The computer-readable storage medium of claim 11, further comprising:

if the fast-post queue contains the first receive request, removing, by the polling thread, the first receive request from the fast-post queue;

if the first receive request that was removed from the fast-post queue matches the third receive request on the unexpected queue, removing, by the polling thread, the third receive request from the unexpected queue and copying the message data from the message unit to the memory location identified by the first receive request that was removed from the fast-post queue; and if the first receive request that was removed from the fast-post queue does not match the third receive request on the unexpected queue, adding, by the polling thread, the first receive request that was removed from the fast-post queue to the posted queue.

15. The computer-readable storage medium of claim 11, wherein the adding the first receive request to the fast-post queue executes faster than the adding of the first receive request to the posted queue, wherein the posted queue comprises a second linked list.

16. The computer-readable storage medium of claim 9, wherein the source node identifier, the type, and the data pointer are received from an application that executes synchronously within the reception, thread.

17. The computer-readable storage medium of claim 9, wherein the reception thread and the polling thread execute asynchronously.

18. A node comprising:

a processor;

a message unit communicatively connected to the processor; and memory communicatively connected to the processor and the message unit, wherein the memory is encoded with instructions, and wherein the instructions when executed on the processor comprise:

receiving, by a reception thread, a source node identifier, a type, and a data pointer, creating, by the reception thread, a first receive request in response to the receiving, selecting, by the reception thread, a selected channel from among a plurality of channels, wherein the selected channel comprises a fast-post queue that is randomly accessible, and adding the first receive request to the fast-post queue if the source node identifier specifies a source node, adding, by the reception thread, the first receive request to an any-source queue that comprises a first linked list if the source node identifier does not specify a source node, and if a message received from a network does not match a second receive request on a posted queue and the message does not match, the first receive request on the any-source queue, adding, by a polling thread, a third receive request that represents the message to an unexpected queue.

19. The node of claim 18, wherein the instructions further comprise:

if the message matches the second receive request on the posted queue and the message does not match the first receive request on the any-source queue, removing, by the polling, thread, the second receive request from the posted queue, and copying message data from the message unit to a memory location identified by the second receive request.

20. The node of claim 19, wherein the instructions further comprise:

if the message matches the second receive request on the posted queue, the message matches the first receive request on the any-source queue, and the first receive request on the any-source queue was received at an earlier time than the second receive request on the posted queue, removing, by the polling thread, the first receive request from the any-source queue, and copying the message data from the message unit a memory location identified by the first receive request that was removed from the any-source queue;

if the message matches the second receive request on the posted queue, the message matches the first receive request on the any-source queue, and the second receive request on the posted queue was received at an earlier time than the first receive request on the any-source queue, removing, by the polling thread, the second receive request from the posted queue, and copying the message data from the message unit to the memory location identified by the second receive request that was removed from the posted queue; and if the message does not match the second receive request on the posted queue, the message matches the first receive request on the any-source queue, removing, by the polling thread, the first receive request from the any-source queue, and copying the message data from the message unit to the memory location identified by the first receive request that was removed from the any-source queue.

21. The node of claim 20, wherein the instructions further comprise:
   if the fast-post queue contains the first receive request, removing, by the polling thread, the first receive request from the fast-post queue;
   if the first receive request that was removed from the fast-post queue matches the third receive request on the unexpected queue, removing, by the polling thread, the third receive request from the unexpected queue and copying the message data from the message unit to the memory location identified by the first receive request that was removed from the fast-post queue; and
   if the first receive request that was removed from the fast-post queue does not match the third receive request on the unexpected queue, adding, by the polling thread, the first receive request that was removed from the fast-post queue to the posted queue.

22. The node of claim 21, wherein the adding the first receive request to the fast-post queue executes faster than the adding of the first receive request to the posted queue, wherein the posted queue comprises a second linked list.

23. The node of claim 18, wherein the source node identifier, the type, and the data pointer are received from an application that executes synchronously within the reception thread.

24. The node of claim 18, wherein the reception thread and the polling thread execute asynchronously.

* * * * *